(12) United States Patent
Austin et al.

(10) Patent No.: US 10,935,398 B2
(45) Date of Patent: Mar. 2, 2021

(54) DISTRIBUTED ACOUSTIC SENSING

(71) Applicant: FOCUS SENSORS LTD., Netley Abbey (GB)

(72) Inventors: Edward Alfred Denzil Austin, Netley Abey (GB); Weizhong Zhao, Bromley (GB)

(73) Assignee: FOCUS SENSORS LTD., Netley Abbey (GB)

(*) Notice: Subject to any disclaimer, the term of this patent is extended or adjusted under 35 U.S.C. 154(b) by 0 days.

(21) Appl. No.: 16/479,109

(22) PCT Filed: Jan. 12, 2018

(86) PCT No.: PCT/EP2018/050793
§ 371 (c)(1),
(2) Date: Jul. 18, 2019

(87) PCT Pub. No.: WO2018/134137
PCT Pub. Date: Jul. 26, 2018

(65) Prior Publication Data
US 2019/0383648 A1    Dec. 19, 2019

(30) Foreign Application Priority Data
Jan. 20, 2017 (GB) .................................. 1700994

(51) Int. Cl.
*G01B 9/02* (2006.01)
*G01D 5/353* (2006.01)

(52) U.S. Cl.
CPC ..... *G01D 5/35335* (2013.01); *G01D 5/35303* (2013.01); *G01D 5/35364* (2013.01)

(58) Field of Classification Search
CPC ...... G01D 5/353; G01D 5/35335; G01D 5/36; G01D 5/35303; G01D 5/35364;
(Continued)

(56) References Cited

U.S. PATENT DOCUMENTS

2008/0088846 A1* 4/2008 Hayward ............... G01H 9/004
356/446
2013/0113629 A1 5/2013 Hartog et al.
(Continued)

FOREIGN PATENT DOCUMENTS

WO    WO2015/180786 A1    12/2015

OTHER PUBLICATIONS

International Search Report and Written Opinion, dated Jun. 7, 2018, from corresponding International Patent App. No. PCT/EP2018/050793.

*Primary Examiner* — Tarifur R Chowdhury
*Assistant Examiner* — Jonathon Cook
(74) *Attorney, Agent, or Firm* — Greenberg Traurig, LLP

(57) ABSTRACT

Systems and methods for sensing changes in an optical sensing fibre, principally for detecting changes in strain. A plurality of optical probe pulses at different optical frequencies ($f_1$, $f_2$, ... $f_n$) spaced by $\Delta f$ are transmitted into the sensing fibre. Light backscattered from the optical sensing fibre may be mixed with delayed backscatter frequency shifted by $\Delta f + f_m$ where $f_m$ is a heterodyne frequency. The backscattered or mixed light may be detected to determine changes in the sensing fibre. $\Delta f$ may be chosen to optimise performance.

19 Claims, 34 Drawing Sheets

(58) Field of Classification Search
CPC ............... G01H 9/004; G01B 9/02005; G01B 9/02014; G01L 1/242; G01L 1/246
See application file for complete search history.

(56) References Cited

U.S. PATENT DOCUMENTS

2016/0290857 A1* 10/2016 Koizumi ................ G01K 11/32
2017/0356793 A1* 12/2017 Nishiguchi ............ G01H 9/006

* cited by examiner $$f_1-(\Delta f+f_m)$$
........................................... $f_0$
$$f_2-(\Delta f+f_m) \quad + \quad 1011 \quad \Delta f$$
........................................... $f_1$
$$f_3-(\Delta f+f_m) \quad + \quad 1021$$
........................................... $f_2$
$$f_4-(\Delta f+f_m) \quad + \quad 1031$$
........................................... $f_3$
$$f_5-(\Delta f+f_m) \quad + \quad 1041$$
........................................... $f_4$

⋮

$$f_n-(\Delta f+f_m) \quad + \quad 10(n-1)1$$
........................................... $f_{n-1}$
$$10n1$$
........................................... $f_n$

SOURCE GENERATOR    BACKSCATTER

FIG. 5

DISTRIBUTED ACOUSTIC SENSING

CROSS-REFERENCE TO RELATED APPLICATIONS

This application is a US national stage under 35 U.S.C. 371 of International Patent Application No. PCT/EP2018/050793, filed 12 Jan. 2018, which claims priority to United Kingdom Patent Application No. 1700994.5, filed 20 Jan. 2017, each of which is incorporated herein by reference in its entirety.

This disclosure relates to optical sensors, and in particular distributed acoustic sensing utilising fibre-optic based sensors.

Optical fibre based sensors are known for detecting various parameters, including acoustic signals, via changes in strain in the fibre. Systems can be broadly characterised as utilising discrete or distributed sensors. Discrete sensors typically position an optical cavity within the optical fibre at the required sensor location. Fibre strain changes cause a change in the physical length of the optical cavity, and thus the optical phase length of the cavity changes for optical signals propagating in the cavity. Detection of output signals from the optical cavity allows phase length changes to be inferred and hence the parameter of interest detected. A number of sensing locations may be provided by each fibre to allow simultaneous measurements from multiple locations. A disadvantage of discrete sensors is that the position and gauge length of the sensor is fixed, thus reducing flexibility. A common application of such sensors is on the sea bed to detect seismic events, and hence repositioning sensors to change a particular sensing location is not practical.

Distributed optical sensors do not have a defined gauge length or sensor position, but use analysis of returned signals to infer phase changes along the length of the fibre and hence detect (usually acoustic) signals. For example, Rayleigh backscatter may be used as the returned signal.

FIG. 1 shows a schematic diagram of a conventional distributed optical sensor commonly known as a Distributed Acoustic Sensor (DAS). An interrogator 10 launches a probe light pulse 11 into a first end of a measurement fibre 12. The measurement fibre 12 is laid in the area in which sensing is required. An advantage of optical sensors, due to the low loss of optical fibre, is the ability to position the interrogator in a different location to the sensing location. There may therefore be a significant length of measurement fibre 12 providing a lead-in from the interrogator 10 to the measurement region from which no measurements are taken.

As the pulse 11 propagates through the optical fibre a portion of the light is scattered by scattering sites in the optical fibre. Part of that scattered light is captured by the numerical aperture of the optical fibre and propagates back towards the interrogator 10. The main scattering mechanism of interest is Rayleigh scattering which results in backscatter at the same frequency as the propagating light due to elastic collisions with scattering sites ("scatterers").

At the interrogator a backscatter pulse 14 is received. The time of arrival at the interrogator is proportional to the roundtrip distance from the interrogator to a point along the fibre. The pulse decays over time due to losses increasing as distance increases. By sampling the pulse 14 at particular times, the backscatter from particular locations along the fibre can be determined. Disturbance of the optical fibre affects its physical structure (at the microscopic level), and speed of propagating light, and hence affects the backscatter pulse 14. Such changes can be used to infer the signal disturbing the fibre. A typical DAS may have a resolution of 1-20 m along a 1-40 km fibre.

In a typical system the probe pulse may be a 10 ns coherent pulse, which in a typical optical fibre has a physical length of approximately 2 m.

FIG. 2 shows a schematic diagram of a typical interrogator 10. Transmitter 20 emits probe pulses, and receiver 21 comprises an optical sensor and sampling system for detecting the backscatter pulses. Optical circulator 22 couples the probe pulses from the transmitter 20 into the measurement fibre 12 and couples returning backscatter pulses to the receiver 21.

Despite the advantages of a configurable gauge length and sensor location, distributed optical sensors suffer significant disadvantages. Their sensitivity is significantly lower than discrete sensors as the return signal is dependent on weak scattering events, not a strong defined reflector. This lack of sensitivity can be such that there is insufficient sensitivity to determine strain and hence detect acoustic or other parameters. Systems may have cross-sensitivity to returning backscatter amplitude leading to distortion and non-linearity in phase measurements and hence measured strain.

Backscatter occurs from a number of scatterers and the scattered light from each scatterer adds coherently to form the backscatter pulse. Since the scatterer locations are random, this addition can be destructive and lead to no return signal. Furthermore the scatterer locations can change over time leading to changes in the addition and hence cause fading of the signal over time. Fading can also occur from birefringence effects.

Improved Distributed Optical Sensors systems are therefore required. The embodiments described below are not limited to implementations which solve any or all of the disadvantages of known systems.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

There is provided an optical source generator for an optical sensing system, wherein the optical source generator is configured to generate a set of n time-aligned optical probe pulses, each pulse being at a distinct optical frequency selected from $f_1, f_2, \ldots f_n$, where n is the number of pulses, each optical frequency being spaced from its neighbour by $\Delta f$, a set of n optical reference signals, each optical signal being at a distinct optical frequency selected from $f_1-(\Delta f+f_m), f_2-(\Delta f+f_m), \ldots f_n-(\Delta f+f_m)$, where $f_m$ is a predetermined frequency, and n is equal to 2 or more.

The set of optical probe pulses may be generated by modulation of a set of source optical signals, each source optical signal being at a distinct optical frequency selected from $f_1-(\Delta f+f_m), f_2-(\Delta f+f_m), \ldots f_n-(\Delta f+f_m)$.

The source optical signals may be modulated by an acousto optic modulator driven during the pulse periods at a frequency of $(\Delta f+f_m)$.

The polarisation of each optical probe pulse and each reference signal may be different to the polarisation of optical probe pulses and reference signals, respectively, at adjacent optical frequencies.

The polarisation of adjacent optical probe pulses and reference signals may be non-orthogonal.

In an example $\Delta f=(2v+1)/(2 \cdot T_d)$ where v is any positive integer and $T_d$ is the optical observation time.

In an example $\Delta f=1/(2 \cdot T_d)$.

$\Delta f$ may be approximately 100-600 MHz.

The optical reference signals may be CW signals.

n may be 50 or greater.

There is also provided an optical sensing system, comprising a length of sensing optical fibre, an optical source generator as described above, an optical receiver system, wherein the optical probe pulses are coupled into the optical sensing fibre, pulses returning from the optical sensing fibre, in the opposite direction to that in which the optical probe pulses are transmitted, are coupled into the optical receiver system, and the optical reference signals are coupled into the optical receiver system without passing through the sensing fibre.

The optical receiver system may be configured to mix pulses returning from the optical sensing fibre with the optical reference signals and to detect the resulting mixed signal.

The sensing optical fibre may comprise at least one sensing region adapted to increase the sensitivity of the system to changes occurring in the at least one sensing region.

There is provided an optical sensing system, comprising a source generator configured to generate a set of n time-aligned optical probe pulses, each pulse being at a distinct optical frequency selected from $f_1, f_2, \ldots f_n$, where n is the number of pulses and n is equal to 2 or more, each optical frequency being spaced from its neighbour by $\Delta f$, the source generator being configured to transmit the optical probe pulses into a sensing optical fibre, wherein the optical probe pulses are backscattered by the optical sensing fibre, at least part of the backscattered light being captured by the optical fibre in a reverse direction to the optical probe pulse propagation, an optical receiver system configured to receive the backscattered light from the optical sensing fibre, wherein the optical receiver system is configured to mix a delayed version of the backscattered light with at least one frequency-shifted version of the backscattered light, wherein the frequency is shifted by $-(\Delta f+f_m)$, where $f_m$ is a predetermined frequency and $f_m$ is less than $\Delta f$.

There is also provided an optical sensing system, comprising a source generator configured to generate a set of n time-aligned optical probe pulses, each pulse being at a distinct optical frequency selected from $f_1, f_2, \ldots f_n$, where n is the number of pulses and n is equal to 2 or more, each optical frequency being spaced from its neighbour by $\Delta f$, the source generator being configured to transmit the optical probe pulses into a sensing optical fibre, wherein the optical probe pulses are backscattered by the optical sensing fibre, at least part of the backscattered light being captured by the optical fibre in a reverse direction to the optical probe pulse propagation, an optical receiver system configured to receive the backscattered light from the optical sensing fibre, wherein the optical receiver system is configured to detect the amplitude of the backscattered light.

The sensing optical fibre may comprise at least one sensing region adapted to increase the sensitivity of the system to changes occurring in the at least one sensing region.

The detected amplitudes may be decoded to provide an indication of strain changes along the sensing optical fibre.

In an example $\Delta f=v/T_d$, where Td is the optical observation time and v is any non-zero integer.

In an example, $\Delta f=(1+2w)/(2 \cdot T_l)$ and/or $(1+2v)/(2 \cdot T_d)$ where w and v are any integers, $T_d$ is the optical signal observation time and $T_l$ is the backscatter delay time.

$\Delta f$ may be approximately 100-600 MHz n may be 50 or greater.

There is provided a method of detecting strain in an optical sensing fibre, the method comprising the steps of generating a set of n time-aligned optical probe pulses, each pulse being at a distinct optical frequency selected from $f_1, f_2, \ldots f_n$, where n is the number of pulses and n is equal to 2 or more, each optical frequency being spaced from its neighbour by $\Delta f$, transmitting the optical probe pulses into a sensing optical fibre, wherein the optical probe pulses are backscattered by the optical sensing fibre, at least part of the backscattered light being captured by the optical fibre in a reverse direction to the optical probe pulse propagation, receiving backscattered light from the optical sensing fibre, detecting the amplitude of backscattered light, and determining phase changes at locations along the optical sensing fibre based on changes in the detected amplitude and the time of the samples showing the changes in amplitude.

In an example wherein $\Delta f=v/T_d$, where $T_d$ is the optical observation time and v is a non-zero integer.

The polarisation of each optical probe pulse may be different to the polarisation of optical probe pulses, at adjacent optical frequencies.

The polarisation of adjacent optical probe pulses may be non-orthogonal.

There is also provided a method of detecting strain in an optical sensing fibre, the method comprising the steps of generating a set of n time-aligned optical probe pulses, each pulse being at a distinct optical frequency selected from $f_1, f_2, \ldots f_n$, where n is the number of pulses and n is equal to 2 or more, each optical frequency being spaced from its neighbour by $\Delta f$, transmitting the optical probe pulses into a sensing optical fibre, wherein the optical probe pulses are backscattered by the optical sensing fibre, at least part of the backscattered light being captured by the optical fibre in a reverse direction to the optical probe pulse propagation, receiving backscattered light from the optical sensing fibre, an optical receiver system configured to receive the backscattered light from the optical sensing fibre, wherein the optical receiver system is configured to mix a delayed version of the backscattered light with at least one frequency-shifted version of the backscattered light, wherein the frequency shift is $-(\Delta f+f_m)$, where $f_m$ is a predetermined frequency and $f_m$ is less than $\Delta f$, and determining phase changes at locations along the optical sensing fibre based on changes in the detected amplitude and the time of the samples showing the changes in amplitude.

In an example $\Delta f=(1+2v)/T_d$, and/or $\Delta f=(1+2w)/T_l$ where $T_d$ is the optical observation time, $T_l$ is the backscatter delay time, and v and w are integers.

The set of optical probe pulses may be generated by modulation of a set of source optical signals, each source optical signal being at a distinct optical frequency selected from $f_1, f_2, \ldots f_n$.

The polarisation of each optical probe pulse may be different to the polarisation of optical probe pulses, at adjacent optical frequencies.

The polarisation of adjacent optical probe pulses may be non-orthogonal.

In an example, $\Delta f$ is between 100 MHz 600 MHz.

There is also provided a method of optical sensing, the method comprising the steps of generating a set of n time-aligned optical probe pulses, each pulse being at a distinct optical frequency selected from $f_1, f_2, \ldots f_n$, where n is the number of pulses, each optical frequency being spaced from its neighbour by Δf, and a set of n optical reference signals, each optical signal being at a distinct optical frequency selected from $f_1-(\Delta f+f_m)$, $f_2-(\Delta f+f_m)$, ... $f_n-(\Delta f+f_m)$, where $f_m$ is a predetermined frequency, and n is equal to 2 or more, transmitting the optical probe pulses into a sensing optical fibre, optically mixing the optical reference signals with backscattered light returned from the optical sensing fibre, detecting the mixed optical signal, and decoding the detected signal to determining strain changes in the sensing optical fibre.

The set of optical probe pulses may be generated by modulation of a set of source optical signals, each source optical signal being at a distinct optical frequency selected from $f_1-(\Delta f+f_m)$, $f_2-(\Delta f+f_m)$, ... $f_n-(\Delta f+f_m)$.

The polarisation of each optical probe pulse and each reference signal may be different to the polarisation of optical probe pulses and reference signals, respectively, at adjacent optical frequencies.

The polarisation of adjacent optical probe pulses and reference signals may be non-orthogonal.

In an example $\Delta f=(1+2v)/(2 \cdot T_d)$ where $T_d$ is the optical observation period, v is an integer.

In an example Δf is between 100 MHz 600 MHz.

There is also provided a source generator for generating a plurality of optical signals at discrete optical frequencies $f_1$, $f_2$, ... $f_n$, where n is the number of frequencies, each optical frequency being spaced from its neighbour by Δf, the source generator comprising, an optical source generating an optical seed signal at a first discrete optical frequency, an optical loop, comprising an acousto-optic modulator driven in CW mode by an RF signal at a frequency Δf, an optical amplifier configured to compensate for optical losses in the optical loop, an optical band-pass filter, with an optical pass-band defined to pass optical frequencies $f_1$, $f_2$, ... $f_n$, an optical input coupler configured to receive the optical seed signal and to couple that optical seed signal into the optical loop, and an optical output coupler configured to couple a portion of light propagating around the optical loop out of the optical loop and to an optical output.

In a example $\Delta f=(1+2v)/(2 \cdot T_d)$ where v is an integer and $T_d$ is optical observation period In an example $\Delta f=1/(2 \cdot T_d)$ where $T_d$ is optical observation period.

In an example $\Delta f=(2v+1)/(2 \cdot T_d)$ and/or $\Delta f=(2w+1)/(2 \cdot T_l)$ where v and w are integers, $T_d$ is the optical observation period and $T_l$ is the backscatter delay of the optical sensor unit.

In an example $\Delta f=v/(T_d)$ where v is a non-zero integer and $T_d$ is the optical observation period.

Δf may be between 100 MHz and 600 MHz.

In an example n is 50 or greater.

BRIEF DESCRIPTION OF THE DRAWINGS

Embodiments of the invention will be described, by way of example, with reference to the following drawings, in which:

FIG. 5 shows an example set of optical frequencies;

DETAILED DESCRIPTION

Figure 1:
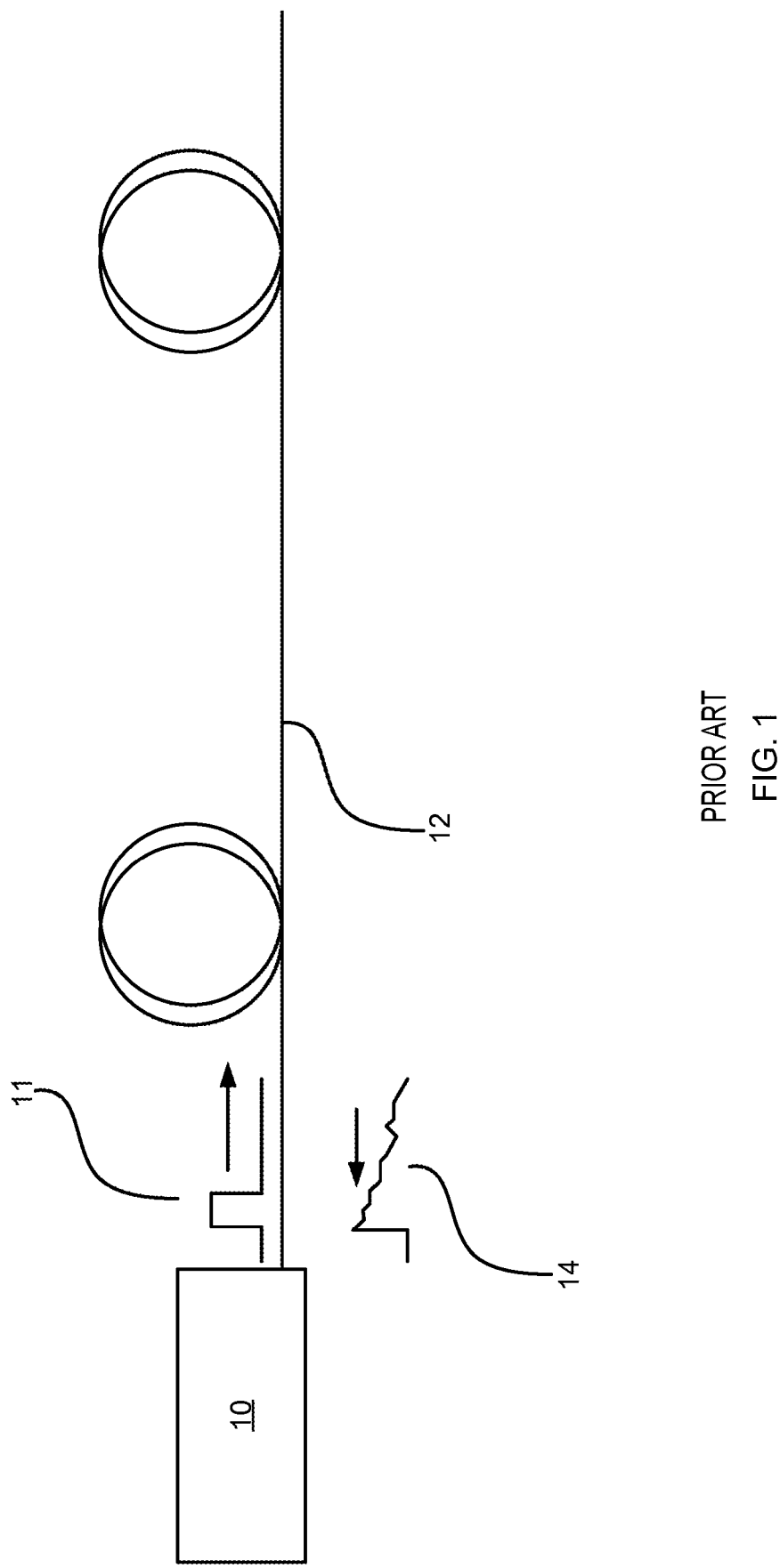
FIGS. 1 and 2 show schematic diagrams of optical sensing systems.

Further details, aspects and embodiments of the invention will now be described, by way of example only, with reference to the drawings. Elements in the figures are illustrated for simplicity and clarity and have not necessarily been drawn to scale. Like reference numerals have been included in the respective drawings to ease understanding.

Figure 2:
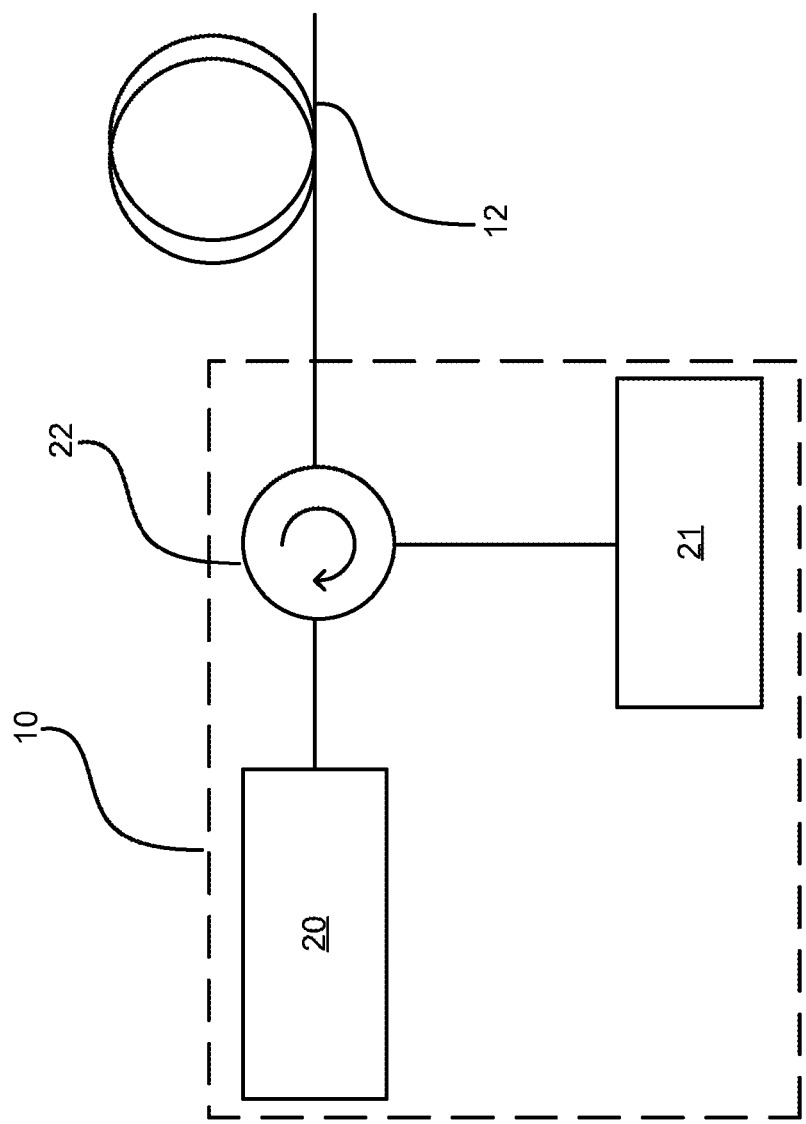
Figure 3:
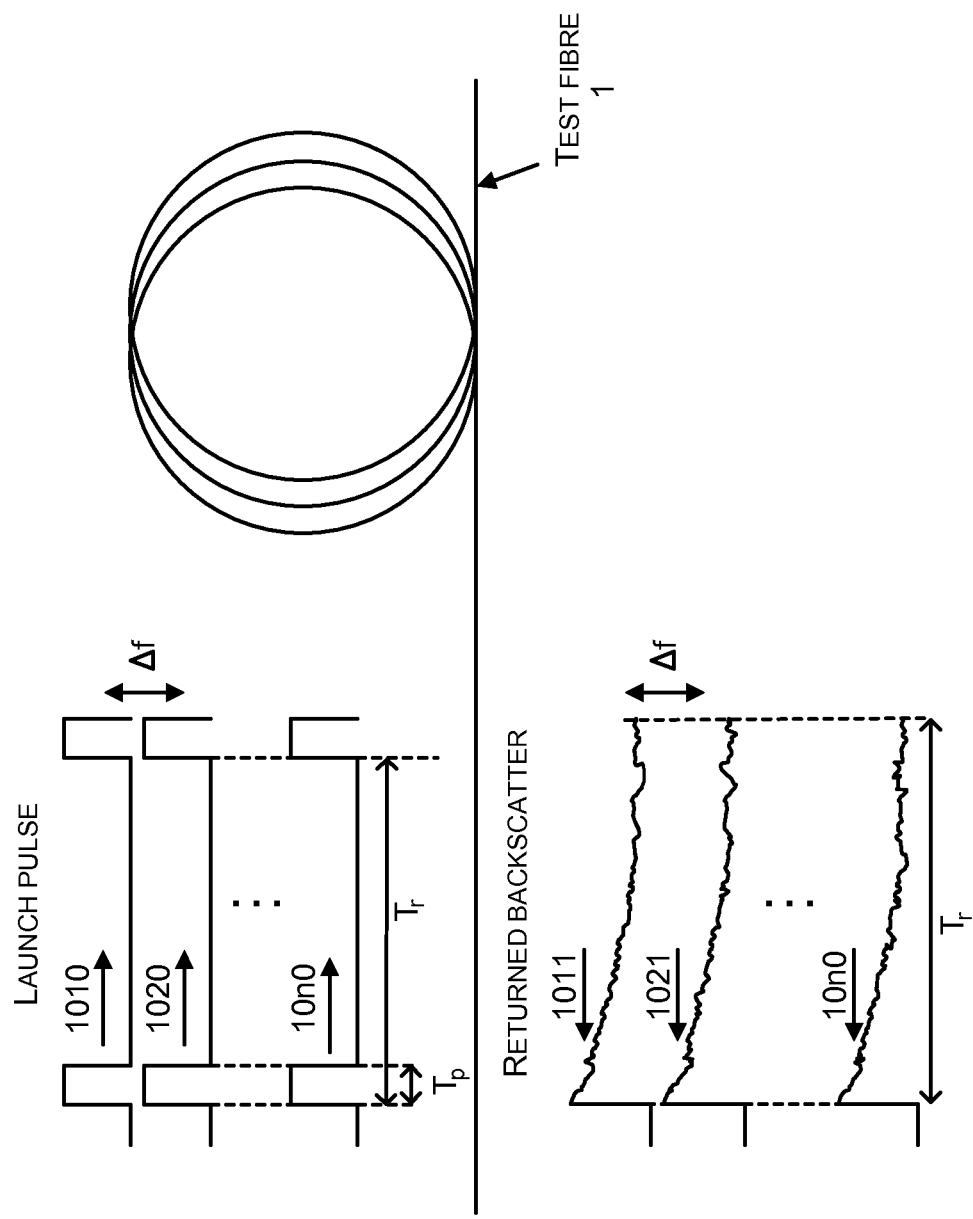
FIG. 3 shows a schematic diagram of pulses launched into and backscattered from an optical sensing fibre.

FIG. 3 shows a schematic diagram of probe and backscatter pulses launched by and returned to an interrogator 10 in a system similar to FIGS. 1 and 2 but configured to transmit probe pulses as described hereinbelow.

The transmitter transmits a set of probe pulses 1010, 1020, 10n0 at different optical frequencies, each frequency being separated from its neighbour by Δf. The pulse width is shown as $T_p$ and the repetition frequency as $T_r$. At the receiver a series of backscatter pulses 1011, 1021, 10n0 are received, again separated by Δf. In a typical system hundreds of frequencies may be utilised. $T_r$ and $T_p$ are selected to provide the required sensing frequency and performance. $T_r$ is also selected dependent on the maximum distance to be sensed to avoid overlap between the backscatter signal from the end of the fibre, with the backscatter signal from the subsequent probe pulse at the start of the measurement fibre. These returning backscatter signals may be used in a number of systems to improve prior art DAS systems as described hereinbelow.

Figure 4:
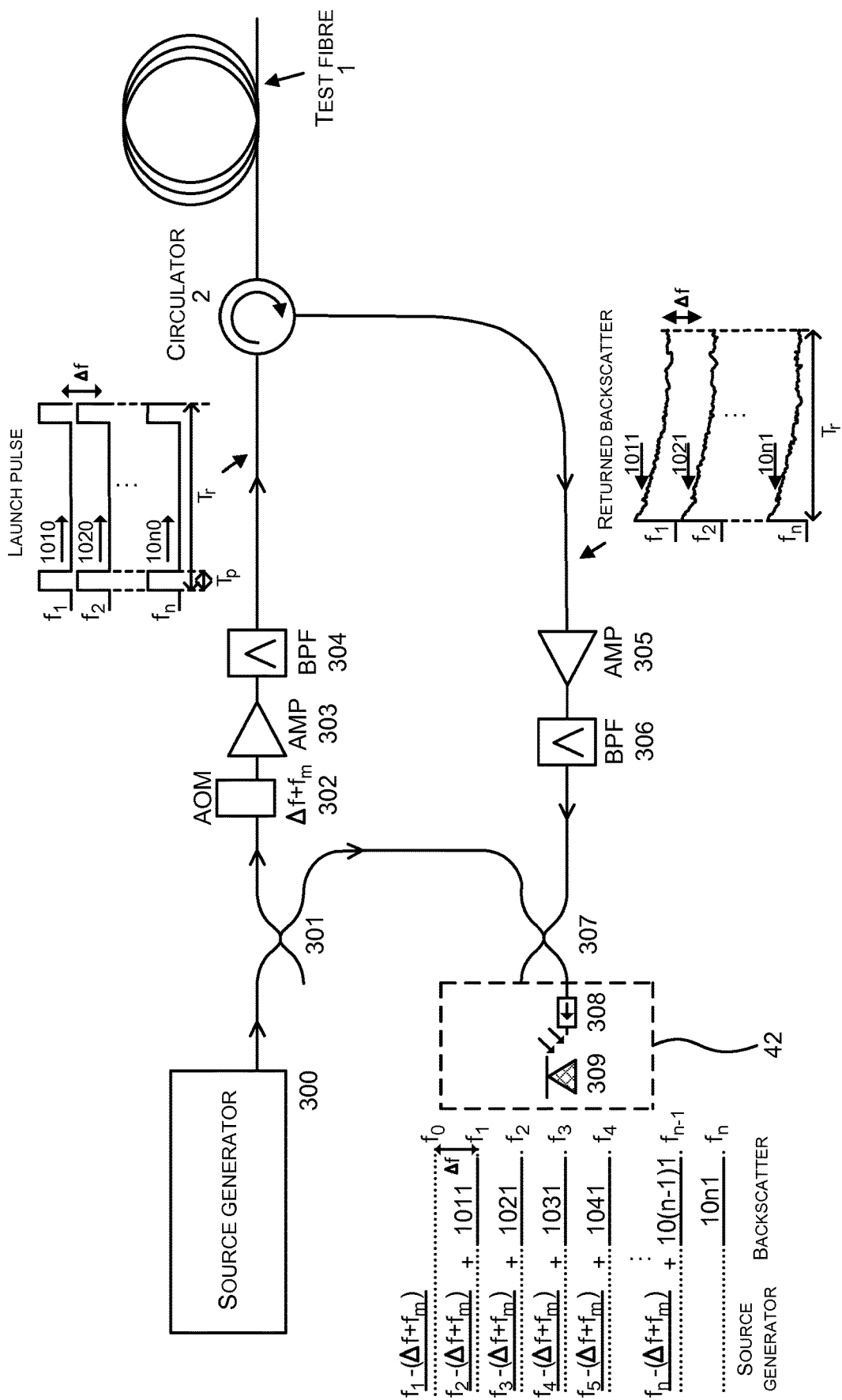
FIG. 4 shows an optical sensing using probe and reference pulses.

FIG. 4 shows a schematic diagram of a system utilising probe signals as described in relation to FIG. 3. The system may be referred to as a frequency domain reflectometer. The output of source 300 is connected to optical coupler 301 from which one output is connected to the measurement fibre, and one to the receiver 42 to provide a reference signal. Coupler 301 may be a 50:50 coupler, or may be selected to direct a greater portion of light to the measurement fibre or receiver in order to optimise signal to noise ratio.

The source 300 generates a CW optical signal at a plurality of frequencies, which are modulated by Acousto-Optic Modulator (AOM) 302 to generate probe pulses 1010, 1020, 10n0 at $f_1$, $f_2$ ... $f_n$, each spaced from its neighbour by Δf. It is expected that n will be in the hundreds. For example, n may be greater than 50 or 100, depending on the particular requirements of the system.

AOMs modulate light using an RF signal to diffract light propagating through a medium, and as a result the frequency of the output light is shifted by the RF frequency. The RF frequency for AOMs ($f_{RF}$) is typically in the region of 200 MHz, and $\Delta f$ may be selected such that $f_{RF}=(\Delta f+f_m)$, where fm is the desired heterodyne frequency. The optical frequencies output by the source 40 are thus given by $f_1-(\Delta f+f_m)$, $f_2-(\Delta f+f_m) \ldots f_n-(\Delta f+f_m)$. $f_m$ is typically small compared to $\Delta f$, for example a few kHz. $f_m$ could be chosen to be zero, giving a homodyne system.

$f_m$ may be chosen to be $<1/(T_r)$, thus enabling a separate heterodyne carrier for points along the measurement fibre.

The probe pulses 1010, 1020, 10n0 may be amplified 303 and filtered 304 before being launched into the measurement fibre 1 via optical circulator 2. Returning backscatter is coupled by circulator 2, optionally through an amplifier 305 and filter 306, to optical coupler 307. In coupler 307 the backscatter light is mixed with the unmodulated light from the source 300 and directed to receiver 42.

At the receiver the backscatter pulses at $f_1, f_2 \ldots f_n$ mix with the CW optical signals from the source (transmitted via couplers 301, 307) at $f_1-(\Delta f+f_m), f_2-(\Delta f+f_m) \ldots f_n-(\Delta f+f_m)$, as shown graphically in FIG. 5. Each returned frequency mixes with its adjacent higher frequency from the source generating a heterodyne frequency of $f_m$, phase modulated by phase changes in the backscattered light caused by changes in the scatterers causing the backscatter.

Figure 6:
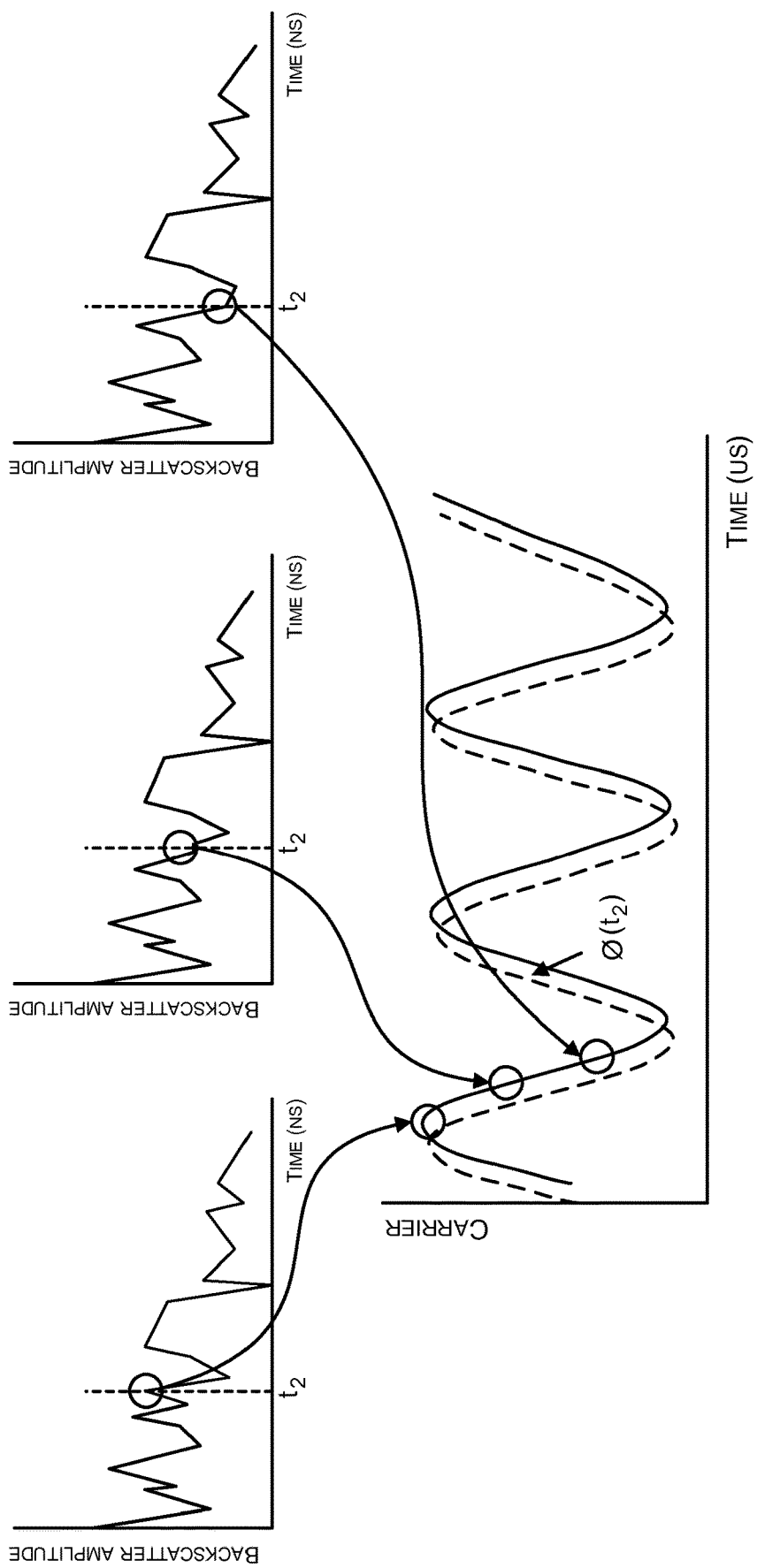
FIG. 6 shows backscatter signals.

Consider a gauge length in the test fibre corresponding to backscatter returning to the interrogator with delay $t_1$ relative to the launch pulse. As shown in FIG. 6, a snapshot of the backscatter from this gauge is sampled by each launch pulse. Subsequent samples build up a carrier at heterodyne frequency $f_m$, as shown in the figure, because the phase difference between the local source and the returned backscatter increases by $2\pi$ at frequency $f_m$, thus cycling through constructive and destructive interference at a frequency of $f_m$. Changes in the total optical phase within the test fibre up to time $t_1$ add or subtract from this total phase difference, changing the moment at which constructing or destructive interference occurs, and therefore causing phase modulations in the carrier. In this way the phase of the heterodyne carrier relative to the shift $f_m$ ($\phi(t_1)$) is a measure of the integrated strain changes in the test fibre up to the distance along the fibre corresponding to $t_1$. To compute the phase change within the gauge length (i.e. the length of fibre travelled during a time $\Delta t$) we compute $\phi(t_1)-\phi(t_1-\Delta t)$.

As noted above, backscattered light adds coherently from a plurality of scatterers and can thus sum destructively such that there is no return signal which can be measured. As explained in detail below the use of a large number of probe pulses at discrete frequencies may reduce the probability of destructive addition occurring.

Coherent fading occurs when the scattering from multiple scatterers superpose to generate no or little backscatter signal on the optical detector. When no backscatter is received from a section of fibre, no measurements can be made or SNR is reduced. This effect is clearly undesirable.

Figure 7:
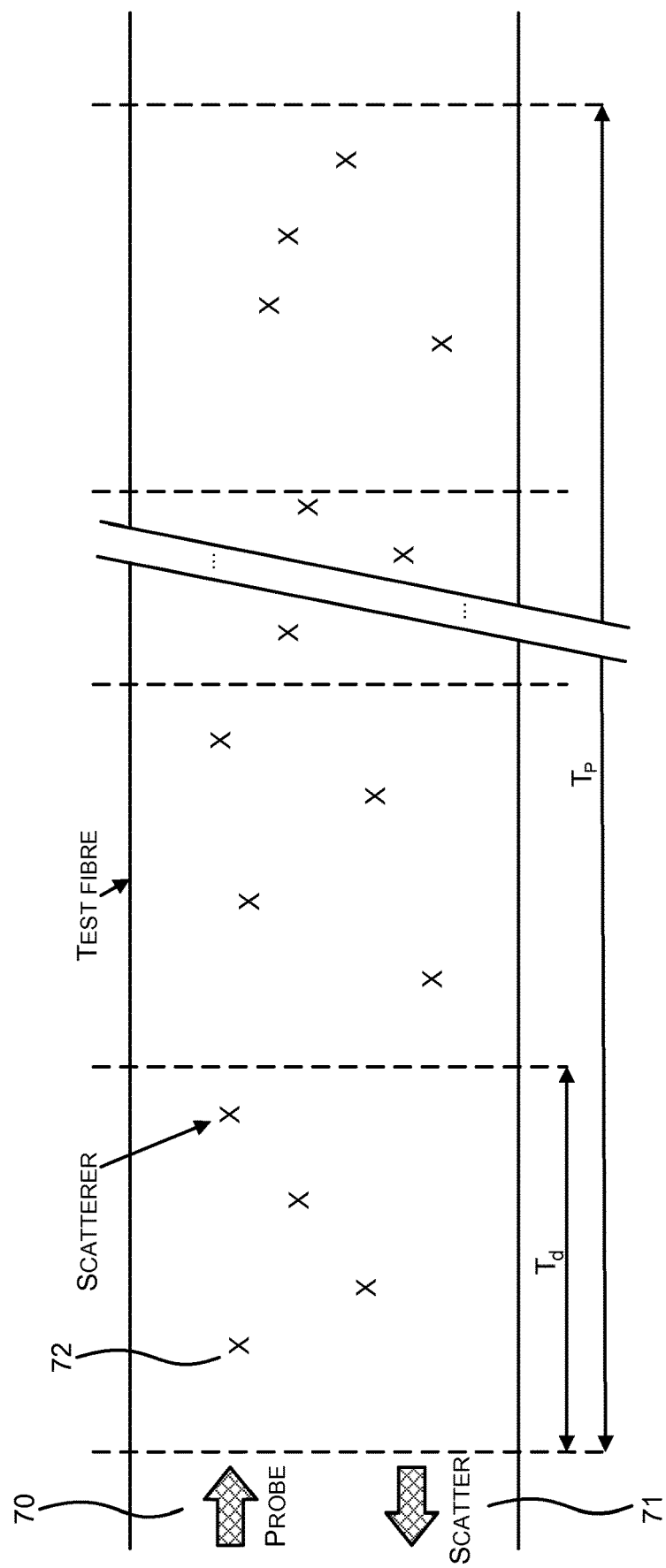
FIG. 7 shows a schematic diagram of optical scattering sites.

FIG. 7 shows a section of the measurement fibre, with probe light 70 propagating left to right, and backscatter 71 returning right to left. The probe pulse has a duration $T_p$, typically of the order of 10-100 ns. The backscatter may be sampled over the period $T_d$. Scatterers 72 are distributed randomly through the fibre with average delay between scatterers significantly shorter than $T_d$. Each site provides a reflection, each of which adds together coherently. Each sample represents the superposition of all reflections illuminated by the pulse of length $T_p$ during the window time period $T_d$. In this way, scatterers within a length of fibre corresponding to $T_p+T_d$ contribute to the total light power sampled during $T_d$. However, scatterers corresponding to durations $T_d/2$ at the beginning and end of the pulse are not illuminated for the whole observation time so can be ignored.

Figure 8:
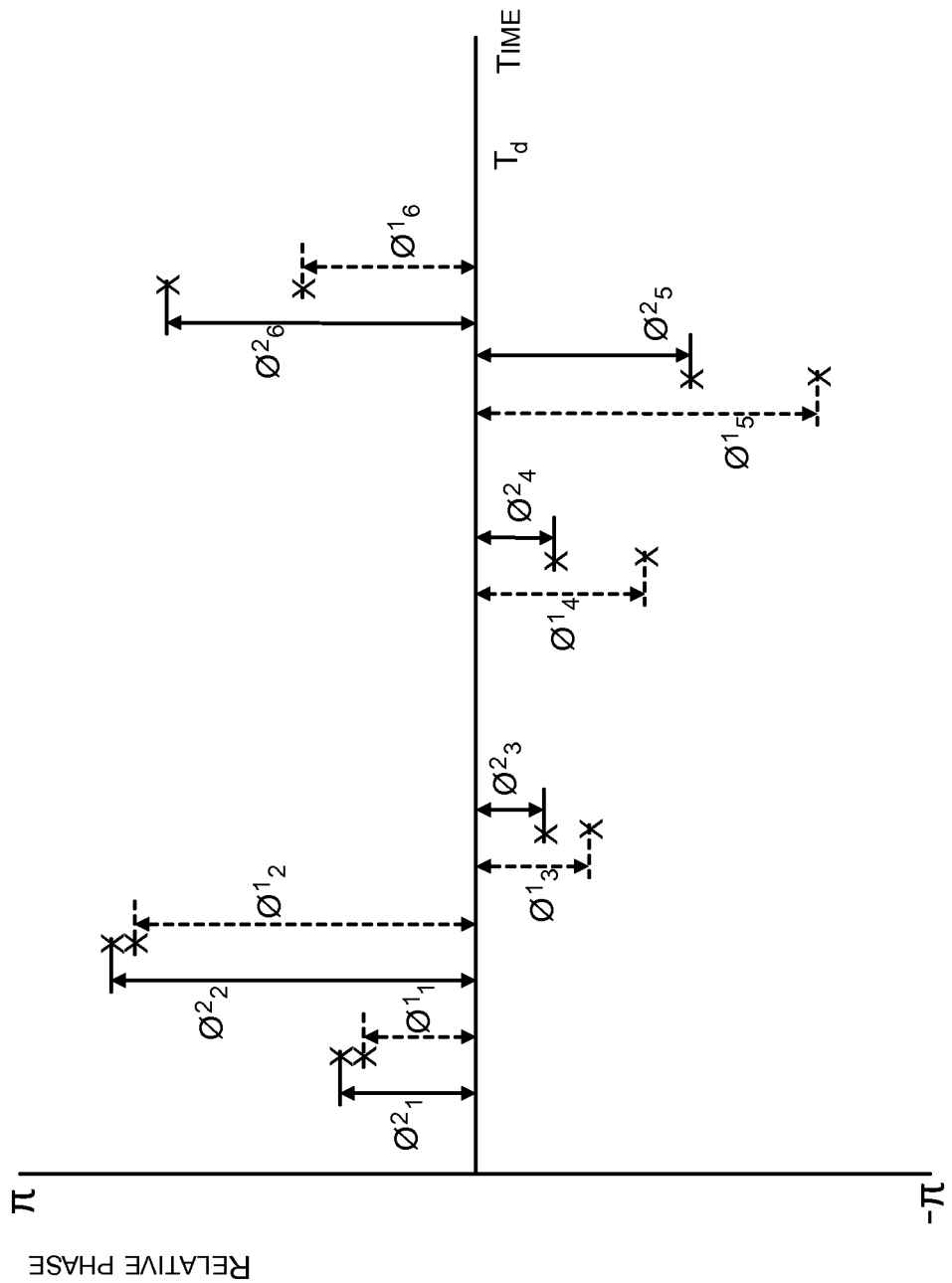
FIG. 8 shows a chart of optical phase for a range of scattering sites.

FIG. 8 shows schematically the optical phase $\phi^q_p$ relative to a reference for optical frequency q from scattering site p. For the purposes of this discussion it is assumed that all scatterers return with the same power. FIG. 8 represents two frequencies, 1, 2, and six scatterers 1-6. As can be seen visually in FIG. 8 the phase of each frequency from a particular scatterer is different, as would be expected, and the difference increases with time (distance along the fibre). The time delay of each reflection relative to the reference is $d_p$, such that:—

$$\emptyset_p^2 = \emptyset_p^1 + 2\cdot\pi\cdot d_p/\Delta f$$

As the laser is coherent over $T_p$ the number of $2\pi$ within each scatter phase delay can be ignored, so that $-\pi < \emptyset^q_p \leq \pi$. Hence, in order for one probe frequency to be fully faded (i.e. no return signal), for every scatterer p there must exist another scatterer j with opposite phase such that $-\emptyset^q_p = \emptyset^q_j$ or $$\sum_p \emptyset_p^1 = 0$$

$\Delta f$ can be selected such that the phase difference between light at $f_1$ and $f_2$ varies by less than $2\cdot\pi$ within $T_d$ (i.e. $\Delta f<(1/T_d)$). It is then even less likely that backscatter from both $f_2$ and f1 will fully cancel at the same time. For scatterers where $\emptyset^1_p$ is sufficiently small that $\emptyset^2_p > \emptyset^1_p$, there cannot exist a j such that $\emptyset^2_j = -\emptyset^2_p$ i.e.

$$\Sigma_p = \emptyset_p^2 - \Sigma_p\emptyset_p^1 = \Sigma_p(\emptyset_p^1 + 2\cdot\pi\cdot d_p/\Delta f) - \Sigma_p\emptyset_p^1 = \Sigma_p 2\cdot\pi\cdot d_p/\Delta f \neq 0$$

For scatterers where $\emptyset^1_p$ is sufficiently large to wrap around an oscillation, such that $\emptyset^2_p < \emptyset^1_p$ the situation is more complex. It can be shown that the set of scatterers that achieve coherent fading at both frequencies is small.

If it is assumed that scatterers are on average evenly distributed through the illuminated sections $T_d$ within $T_p$, then on average the backscatter will be strong at $f_2$ when the backscatter at $f_1$ is mostly faded if the phase difference between them is $\pi$ over time $T_d$, (i.e. $\Delta f=1/(2\cdot T_d)$). In this way, scatterer pairs from early and late in $T_d$, that superpose to generate no light at $f_1$, superpose to generate strong light at $f_2$. In this way, a system using two coherent frequencies with an appropriate difference frequency can be broadly immune to coherent fading.

In typical systems, with $T_d$ in the region of 4 ns, an optimum $\Delta f=1/(2\cdot T_d)$) is 125 MHz (a range of 100-600 MHz may be appropriate for certain examples). In some cases, $T_d$ may be significantly longer, to improve the SNR at the receiver. This can lead to lower optimum $\Delta f$ values that fall within the desired detection band, making it impossible to discriminate between nearby disturbances on the optical fibre. In this case, a setup of $\Delta f=(2v+1)/(2\cdot T_d)$ can be used, where v is any integer is highly likely to provide strong backscatter from $f_2$ if $f_1$ is faded, allowing measurements to be made.

In practice, the sampling window across $T_d$ may not be rectangular, so some tuning of $\Delta f$ and $T_d$ may be required to minimise fading.

Figure 33:
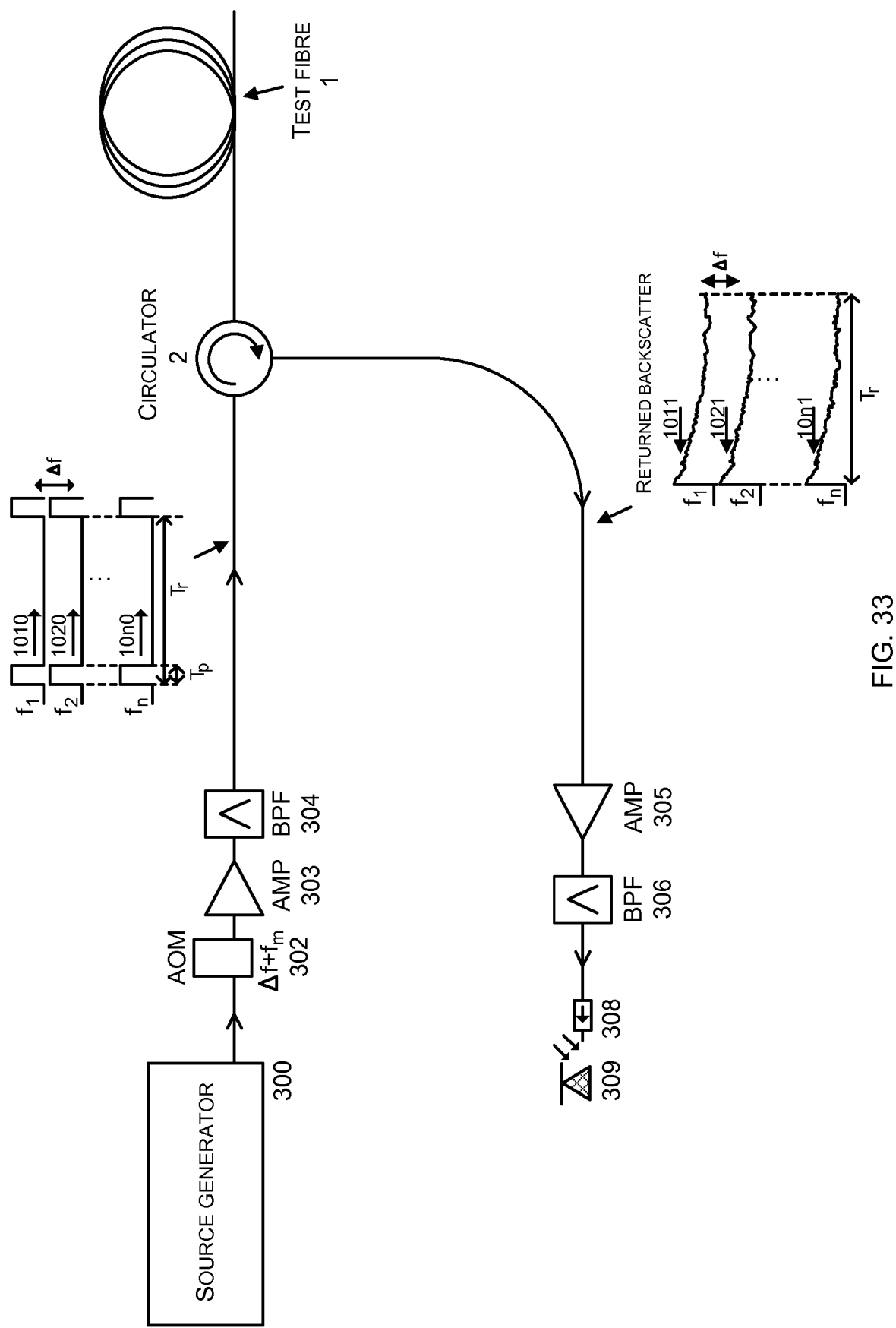
FIG. 33 shows a system using direct-detection.

The same principle can be reversed to create composite pulses which are more likely to suffer from intra-pulse coherent fading than single frequency pulses, by setting $\Delta f=v/T_d$ where v is any non-zero integer (for example). This may be useful to create distributed sensors where changes in fibre strain intentionally cause changes in the backscatter magnitude from each point on the fibre, which are directly decoded, as shown in FIG. 33. In contrast to other systems disclosed herein, the returning backscattered pulses are directly detected at 309 (after optional filtering and amplification at 305, 306).

Changes in amplitude of the returning pulses can thus be determined, but phase information cannot be extracted. In the absence of phase information the non-linear relationship between stain and amplitude cannot be decoded and hence quantitative measurements of strain changes cannot be made. However, the system provides an indication that strain has changed at a particular location (location being determined from the round trip time). The information that a change of some form has occurred may be useful in certain applications, particularly in combination with a measurement over time that indicates the frequency of the change.

Returning to the minimum fading embodiment, for perfect cancellation, the same power from each reflection must be captured by the fibre. The probability of perfect coherent fading is small, but can occur. However, perfect fading is not required to degrade performance since any amount of fading reduces signal levels and hence reduces Signal to Noise Ratio.

In the above example, two frequencies have been considered, but the probability of complete fading may be reduced further by increasing the number of optical frequencies.

At the receiver only light in the same polarisation interferes to add coherently and give the required signals. Polarisation alignment is therefore required between the backscatter signals and the reference signal from the source. Birefringence in the fibres and components can lead to changes in polarisation of propagating light. Although polarisation can be adjusted to adapt to slow changes that affect the whole backscatter, polarisation may also change more rapidly than can be accommodated (for example within each backscatter trace), leading to polarisation fading of the received signals. Temperature and strain can cause variations in birefringence, leading to undesired cross-sensitivity of measurement SNR to temperature, vibrations, and even strain changes that are intended to be measured.

Figure 9:
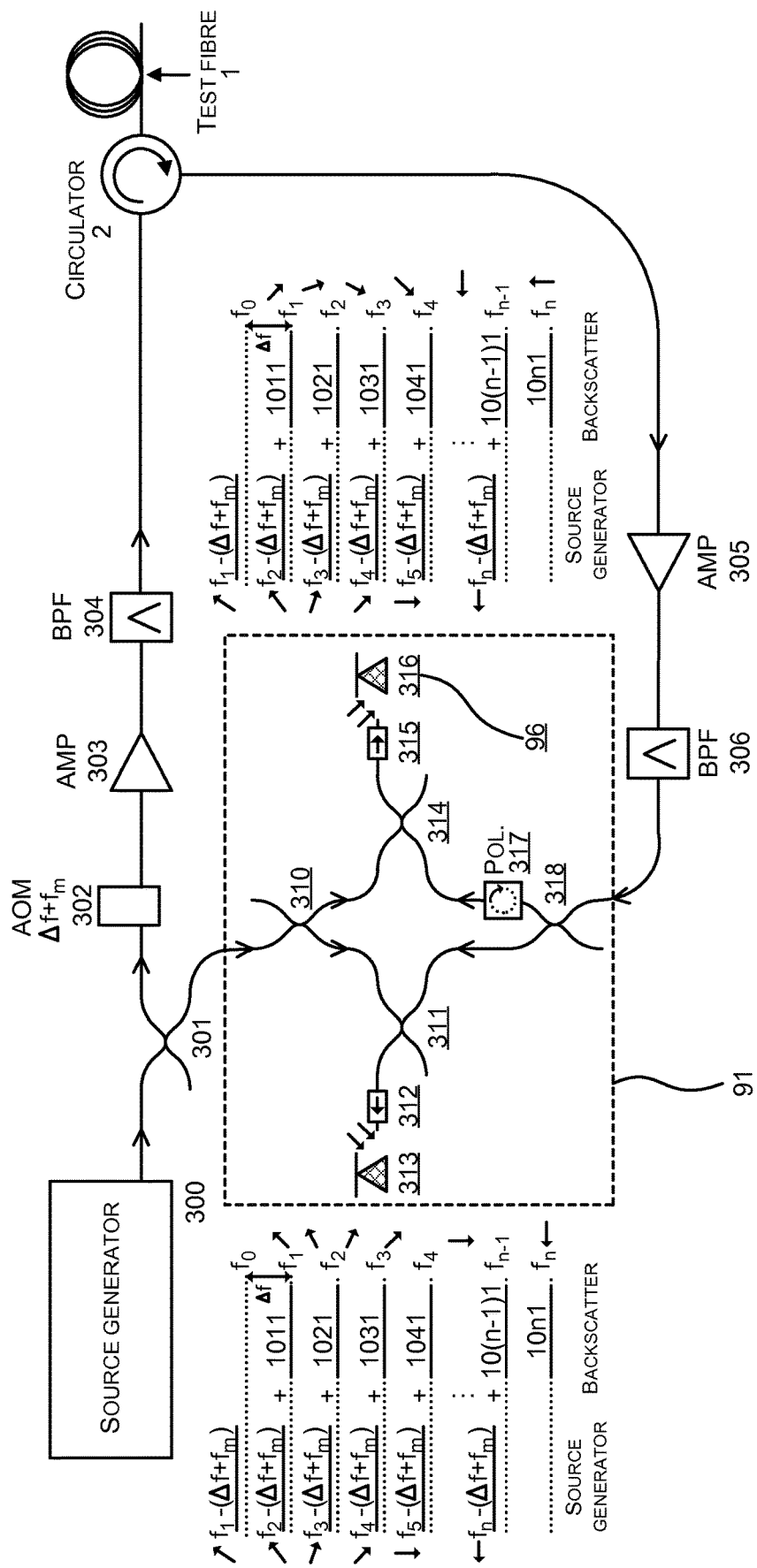
FIG. 9 shows a schematic diagram of an optical sensing system and receiver architecture.

FIG. 9 shows a schematic diagram of a system using the same principles described above, but includes a means to mitigate polarisation fading. Source 300 generates an array of frequencies spaced at $\Delta f$, as described above, but in this example neighbouring frequencies have different (but not orthogonal) polarisations. Components shown in FIG. 9 with the same reference numerals found in FIG. 4 provide equivalent functions. If birefringence does not generate circularly polarised light neighbouring frequencies may be orthogonal.

At the receiver 91 light from the source 300 is split by coupler 310 to couplers 311, 314. An output of each coupler 311, 314 is connected to a detector 313, 316. Backscatter signals from the measurement fibre are split by coupler 318 to couplers 311, 314. One of the paths includes a polarisation controller 317 which rotates the polarisation of the backscatter light by 90°. The example polarisation controller 317 could also be positioned in any of the other three paths.

As the neighbouring frequency components (which interfere at the receiver as described above) are not orthogonally polarised, in the absence of birefringence, interference will appear at both 313 and 316. As long as the source generator produces light having components of every polarisation (including circularly polarised components), then no matter the birefringence of the components and test fibre, interference always appears at 313 or 316 or both, and measurements can always be made. Both linear and circular polarisations are transmitted by the source generator. It is possible that birefringence will form a quarter wave plate to convert linear to circular polarisation at some point along the fibre length. If only linear polarisations are launched this may prevent interference (due to beating a linear against a circular polarisation). The transmission of both linear and circular polarisations avoids this limitation.

As noted above, the systems described with reference to FIG. 4 operate as a frequency domain reflectometer, comparing the backscatter light to a reference directly from the source. Such a system is simple and has a high spatial resolution, but also has disadvantages. The system is dependent on a stable source frequency and changes in that frequency over the backscatter period are indistinguishable from strain changes that are being measured. Also, the measurement of each gauge length is determined from the difference between the integrated strain along the whole length of the fibre to the start of the particular gauge length, and the integrated strain to the end of the particular gauge length. Errors in either measurement, for example due to a phase change beyond the maximum instantaneous frequency that can be demodulated, at any point along the fibre, leads to an erroneous measurement. That is, an excessive change at any point along the fibre leads to an error at all greater distances.

Figure 10:
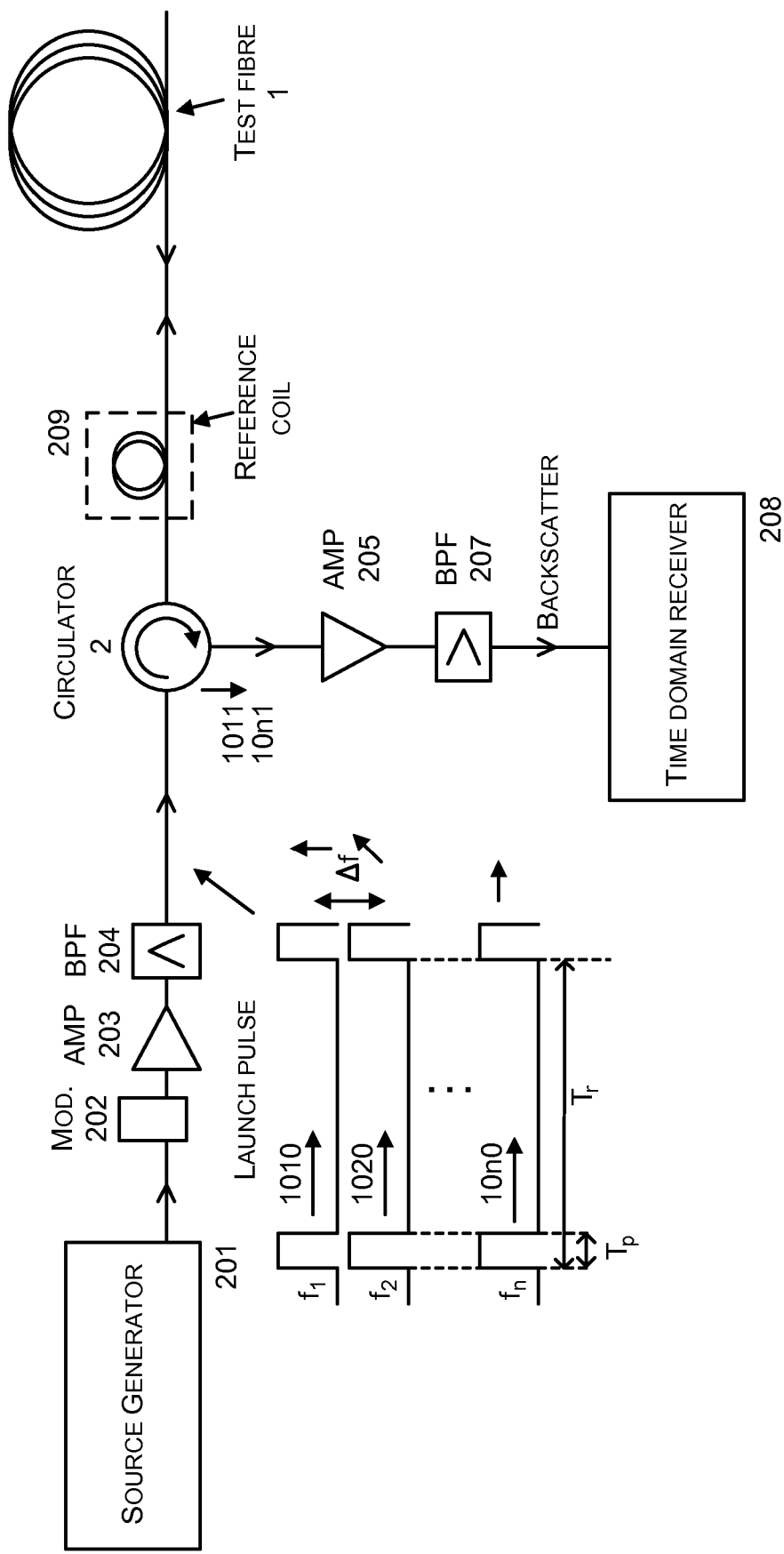
FIG. 10 shows a schematic diagram of an optical sensing system using mixing of backscattered signals and frequency-shifted backscattered signals.

FIG. 10 shows a diagram of a time domain system utilising similar principles to the system of FIG. 4 but which may overcome some difficulties noted above of the frequency domain system. In particular the strain change between two points bounding the gauge length is calculated, independent of strain changes in other locations along the measurement fibre.

The source 201 is equivalent to source 300, and outputs an array of CW optical frequencies (at least two, but typically hundreds) spaced at $\Delta f$. The CW output is modulated by modulator 202, which may be an AOM. However, in this example the frequency shift utilised above is not required and so any type of modulator can be utilised. The probe pulses 1010, 1020, 10n0 from modulator 202 have a duration of $T_p$ and a repetition period $T_r$. The probe pulses 102 are coupled into the measurement fibre by circulator 2, which also couples returning backscattered light to receiver 208. Optional amplifiers 203, 205, and band pass filters 204, 207 may be utilised to improve signal to noise ratio.

A reference coil of fibre 209 may be temperature and vibration controlled to provide a zero signal reference.

Figure 11:
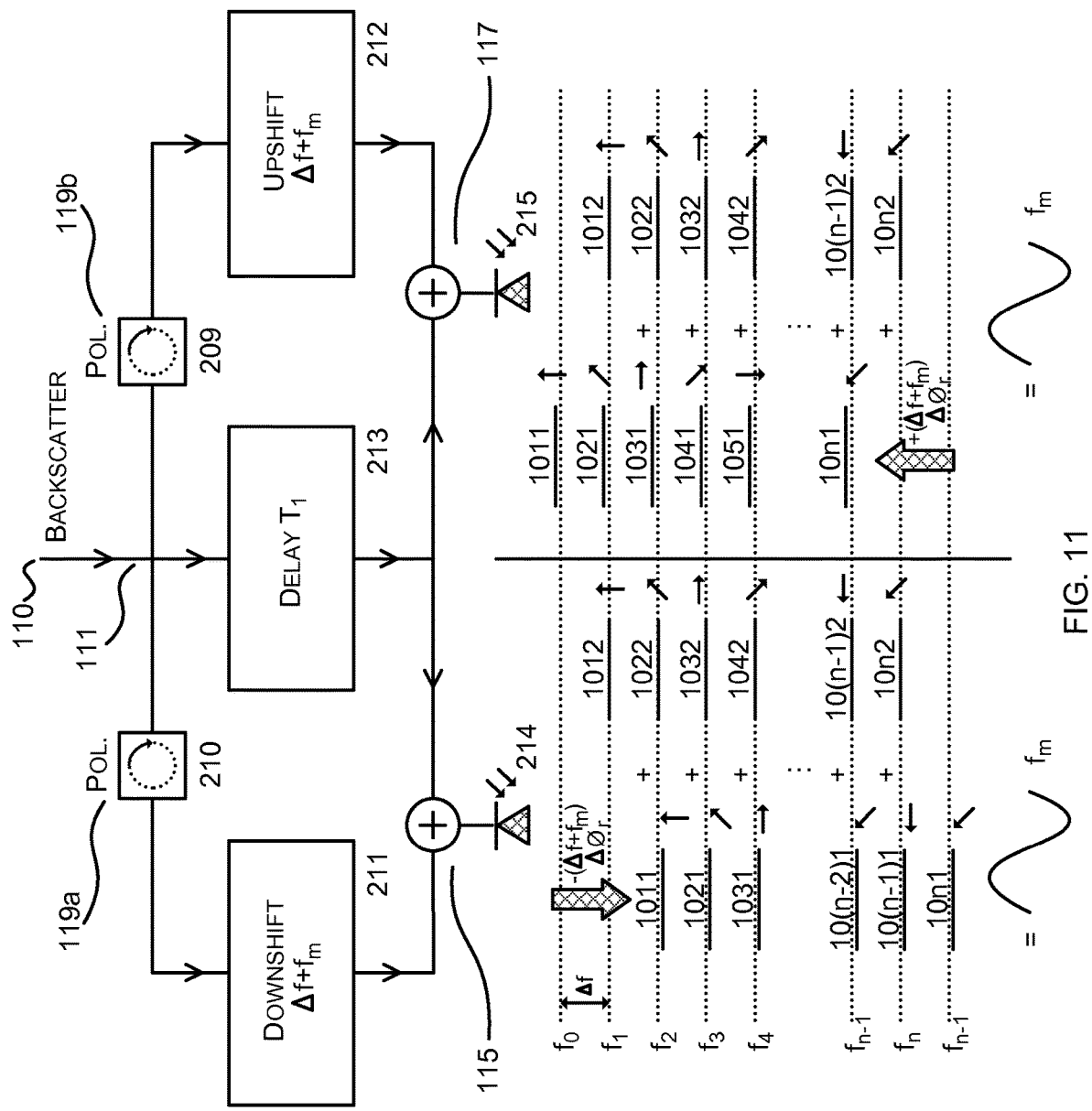
FIGS. 11 and 12 show receivers for the system of FIG. 10.

FIG. 11 shows an example receiver module for use as receiver 208 in the system of FIG. 10. Incoming backscatter at input 110 is split three ways by optical coupler 111. A first optical path is delayed by a time $T_l$ in delay element 213. A second optical path comprises a downshifter 211 which downshifts the optical frequency by $(\Delta f+f_m)$, and an upshifter 212 in the third optical path shifts the frequency up by $(\Delta f+f_m)$. The upshifter 212 and downshifter 211 may be AOMs run in a CW mode to provide frequency modulation, but no amplitude modulation.

The downshifted and delayed signals are combined in optical coupler 115 and received by detector 214. Similarly the upshifted and delayed signals are combined in optical coupler 117 and received by detector 215.

At detector 214 delayed backscattered light at $f_{k+1}$ interferes with undelayed (but downshifted in optical frequency) backscattered light at $f_k$, to produce a heterodyne carrier at $f_m$. Each pair of frequencies combine in this way to form the carrier. Similarly, at detector 215, delayed backscattered light at $f_{k-1}$ interferes with the undelayed (but upshifted in optical frequency) backscatter at $f_k$ to also produce a heterodyne carrier at $f_m$. The generated combinations are shown in the bottom half of FIG. 11.

Optional polarisation controllers 209, 210 may be included to account for birefringence within the receiver optical components. The downshifter 211 or upshifter 212 may be configured to impart a phase difference in the signal such that an arbitrary phase difference is present between the signals from detectors 214, 215 which may provide advantages to the decoding process.

The receiver system of FIG. 11 may be isolated from vibrations and temperature stabilised to avoid changes in the relative path lengths which would lead to errors in measurements.

Figure 12:
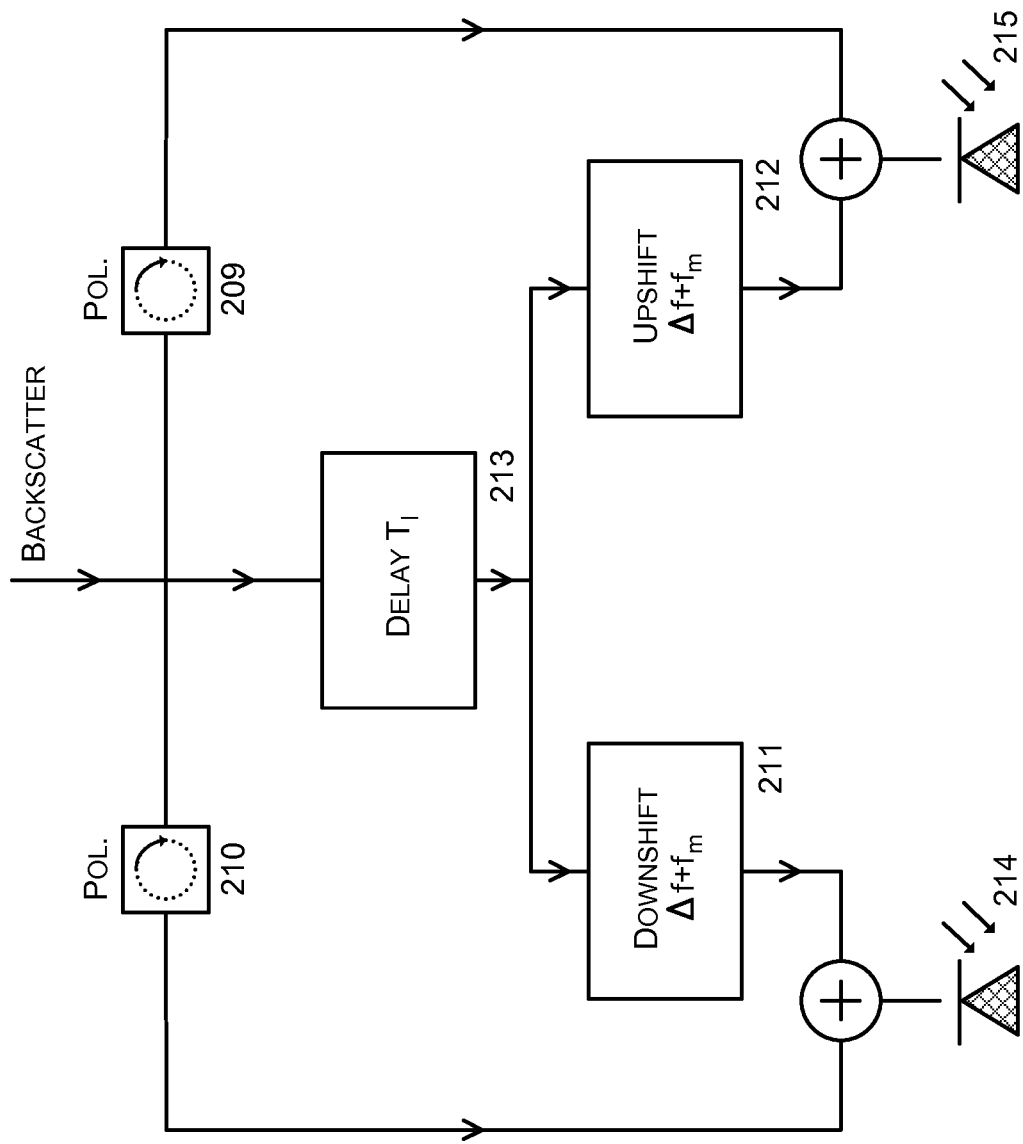

FIG. 12 shows an alternative receiver structure to that of FIG. 11 in which the delay is applied to both the upshifted and downshifted paths, rather than to the unshifted path. The operation of the receiver of FIG. 12 is as described in relation to FIG. 11.

As explained previously, intra-pulse fading can be minimised by setting $\Delta f$ and observation time $T_d$ such that adjacent frequencies are unlikely to be both faded. In this way if 1011+1022 appearing on detector 214 is faded, because 1011 or 1022 has superposed to zero, then 1021 and 1012, which come together on detector 215 are highly unlikely to be faded. Hence a signal should always be present on either detector 211 or 213.

Figure 16:
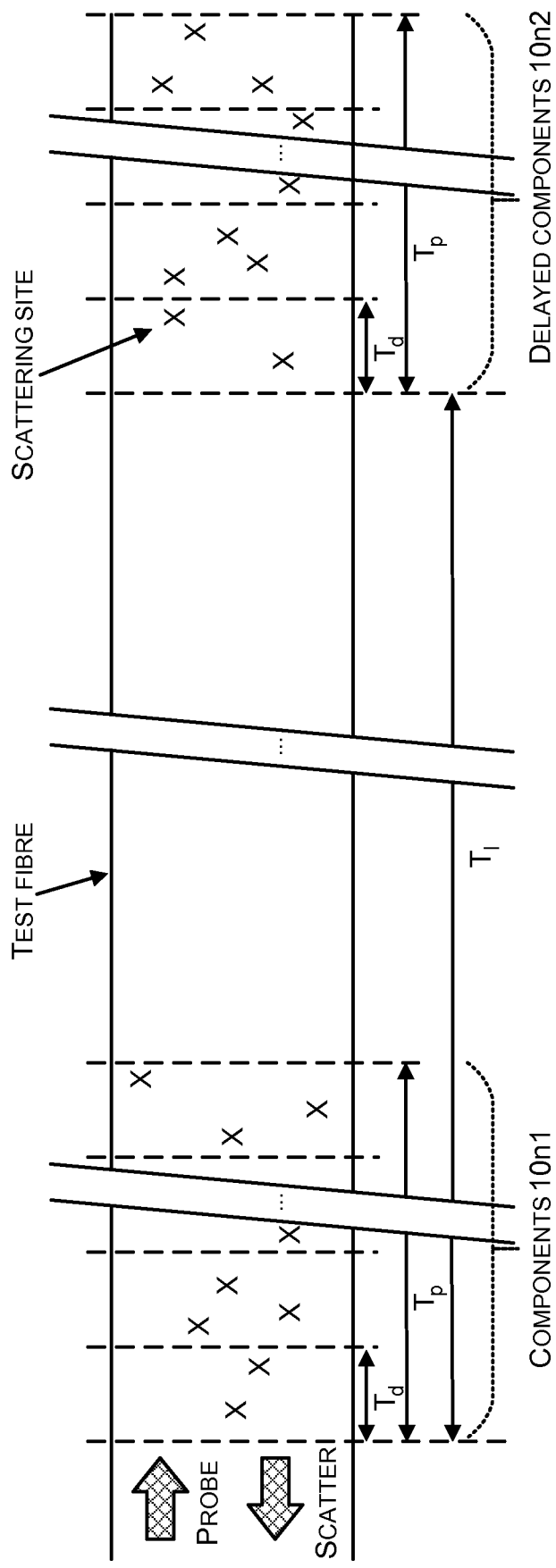
FIG. 16 shows scattering components with reference to inter-pulse coherent fading.

However, because in the time-domain embodiments we have delayed and undelayed backscatters combining, we must also consider inter-pulse coherent fading (FIG. 16). Because the time domain reflectometer superposes backscatter light with delayed backscatter from further along the test fibre, it is possible for components from the delayed and un-delayed backscatters to destructively interfere, generating no light. This possibility can be minimized by optimising the difference frequency $\Delta f$ and delay time $T_l$. Let us consider combination 1011+1022 on detector 214. If this combination generates destructive interference, then backscatters from 1011 must add destructively with delayed backscatter from 1022, enabled by the delay experienced by light of frequency $f_2$ through $T_l$. For the equivalent combination on detector 215 1012+1021, the delay $T_l$ is experienced by light of frequency $f_1$. If the frequency difference $\Delta f$ is set such that $\Delta f=1/(2 \cdot T_l)$, then the combination 1012+1021 on detector 215 must add constructively. In this way, interpulse coherent fading can be minimised. As before, a slightly sub-optimal setting where $\Delta f=(1+2w)/(2 \cdot T_l)$ where w is an integer may be necessary.

When several hundred frequency tones are generated, it might be advisable to detune slightly from this setting, so that combinations at $f_1$, $f_3$, $f_5$ etc. are unlikely to all fade at once.

Figure 13:
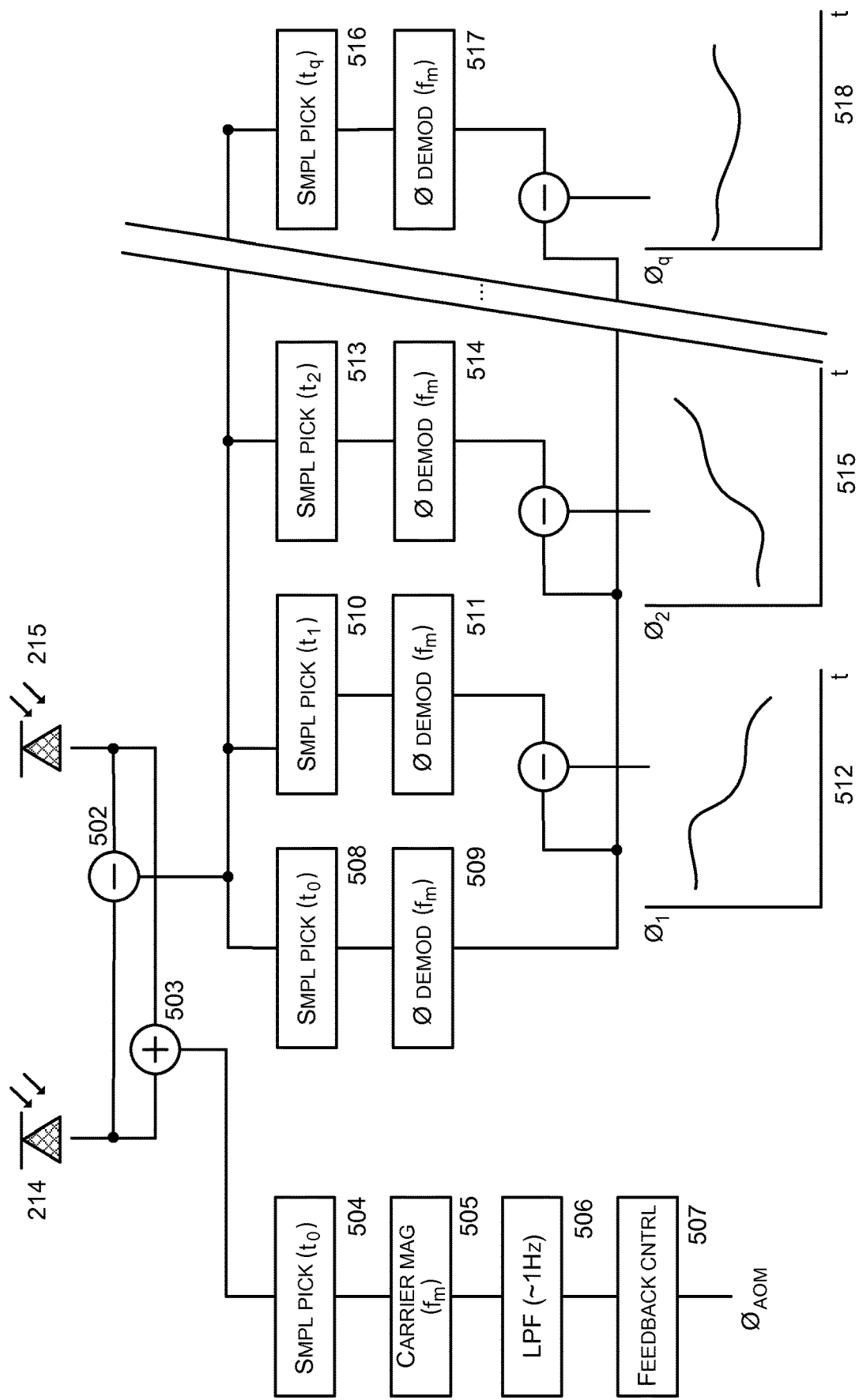
FIGS. 13 to 15 show example processing processes.

FIG. 13 shows a demodulation algorithm for making measurements using signals from the detectors shown in the receivers of FIGS. 11 and 12. This example algorithm is based on arranging 180 degree phase difference between carriers observed on detectors 116 and 118, so that a maximum carrier signal is achieved when signals from the two detectors 214 and 215 are subtracted. This gives the advantage of reducing the effect of common-mode noise, e.g. frequency noise in the upshifter/downshifter drive electronics. Subtracted signals from 502 are split and enter 1 or more sample pick modules (508, 510, 513, 516). These modules extract the backscatter from moments that correspond with areas of interest on the test fibre (arriving at the detectors at delays $t_x$ relative to the probe pulses) and discard the rest. The sample pick modules may also perform averaging or filtering as required. The phase of signals existing the sample pick modules relative to a carrier reference at $f_m$ are computed by modules 509, 511, 514 and 517.

Figure 14:
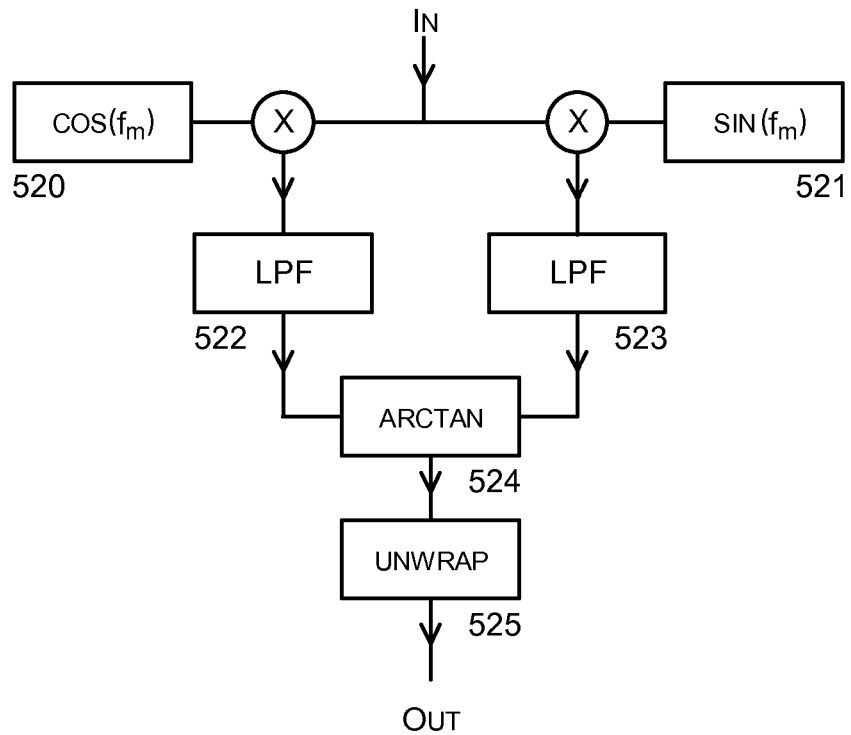

An example standard quadrature phase demodulation module using arctan is shown in FIG. 14. The demodulated phase represents the change in phase within time $T_d$ at points on the test fibre. Backscatter returning with delay $t_0$ corresponds to the un-sensitive reference fibre, so laser noise can be reduced by taking this signal away from signals demodulated from other points on the fibre, to obtain the final phase signals 512, 515 and 518. Clearly, an arbitrary number of points of interest q, up to a maximum of $T_r/T_l$ can be demodulated in this way by adding more sample pick and phase demodulation modules.

Over time, the phase delay and birefringence of optical fibres, components and sources within the interrogator will slowly drift, so it is necessary to make small adjustments of the system operating parameters for continued best operation. $\varnothing_{AOM}$, the phase difference imposed by the upshifter and downshifter modules in the receiver, will be trimmed to maintain anti-phase $f_m$ carriers on detectors 214 and 215. This is achieved by minimising the common-mode carrier received from the reference coil. Summing unit 503 adds light from the detectors 214 and 215. Sample picker 504 extracts backscatter related to the reference coil. The magnitude of power at the carrier frequency $f_m$ is extracted by module 505.

Figure 17:
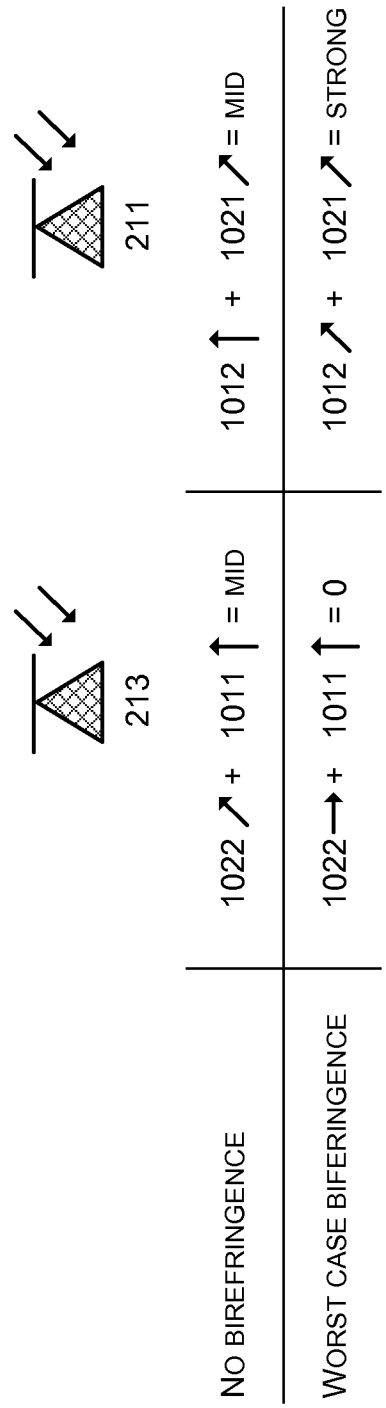
FIG. 17 shows polarisation components.

As mentioned previously, only light components of similar polarisation superpose to generate interference. Hence there is a possibility that birefringence in the optical test fibre 1 and interconnecting components can conspire such that no interference light is generated on detectors 214 and 215. This can be overcome by setting polarisation controller 209 and 210 to make up for any residual birefringence in the receiver interferometer. The source generator can then be set such that neighbouring light component frequencies have 45 degree relative polarisation, with initial polarisation set such that light components of every polarisation state are launched in the composite pulse. As shown in FIG. 17 for one frequency component pair, no matter the birefringence of the test fibre, interference is observed on at least one detector.

Figure 15:
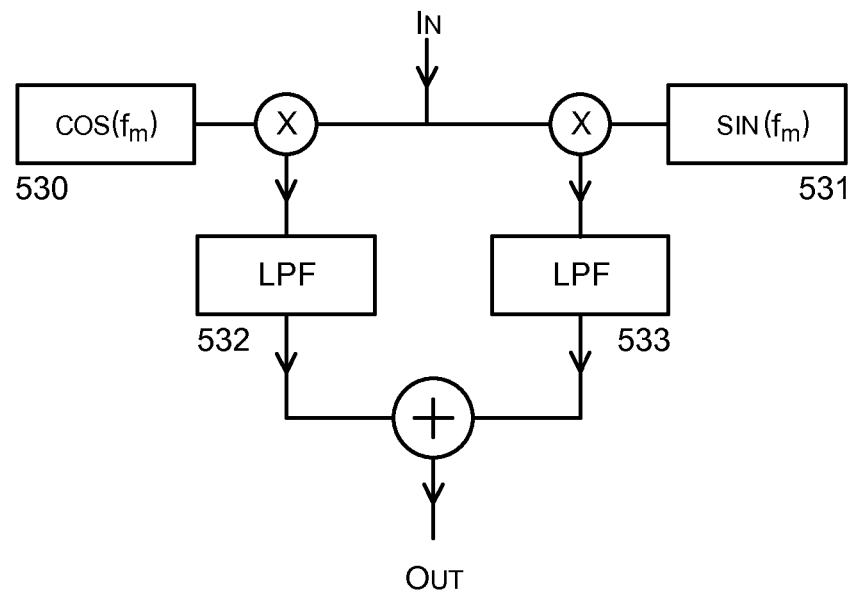

FIG. 15 shows an example carrier magnitude measurement module. The strength of carrier received is Low Pass filtered by 506. A Feedback module 507 adjusts the phase difference imposed by the upshift and downshifters $\varnothing_{AOM}$ such that minimum signal is output from module 506, thus ensuring the carriers appear at the two detectors in anti-phase.

Figure 34:
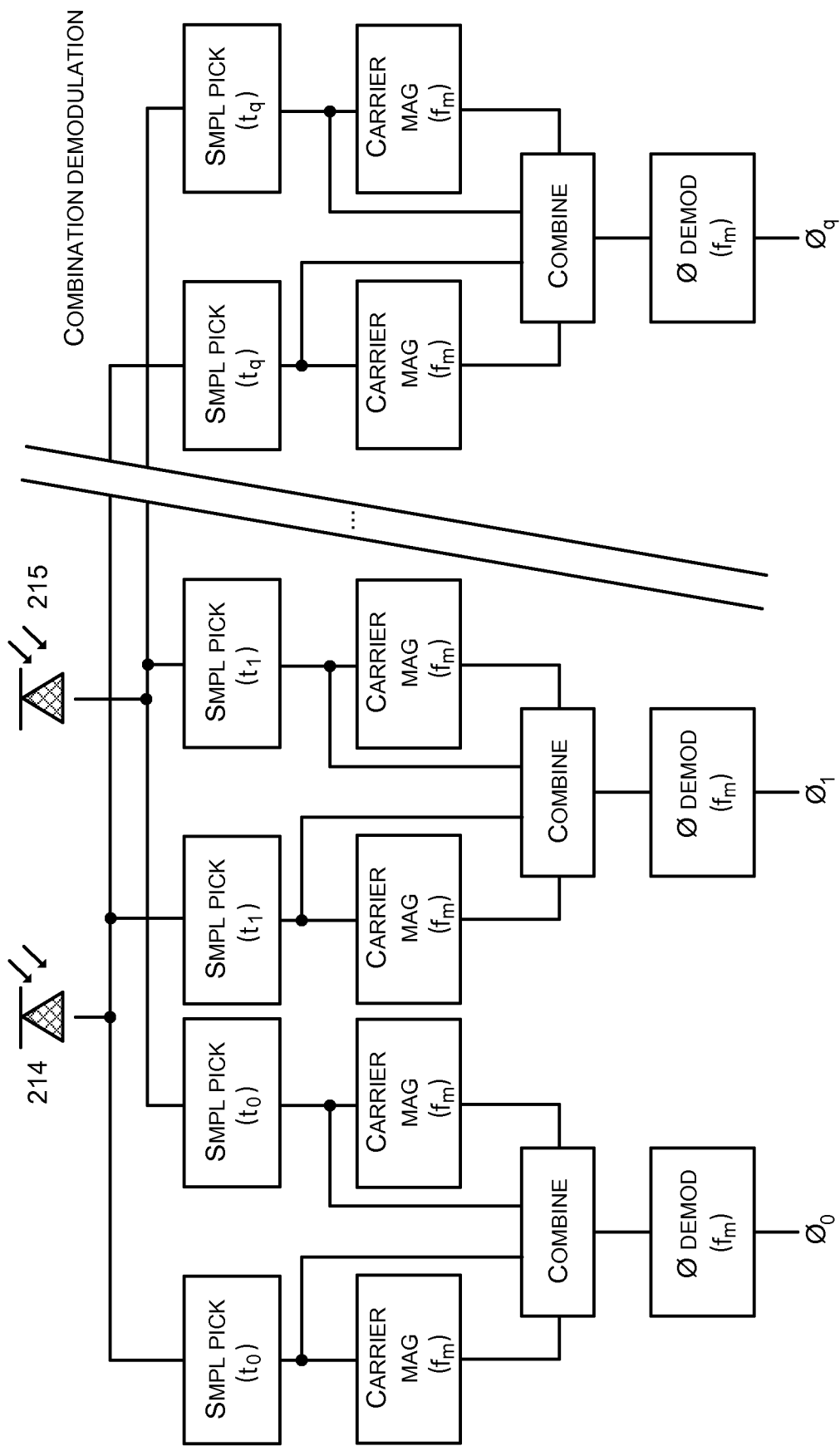
FIG. 34 shows a demodulation algorithm.

FIG. 34 shows an alternative demodulation algorithm that combines signals from the detectors separately. Here the backscatter corresponding to each point on the test fibre is separately determined from each of the detectors, resulting in two picked sample streams for each point of interest on the test fibre. The strength of the carrier within each of the picked-sample streams is then determined. A combination step selects or combines backscatter from two (or more) resulting picked carrier sample streams, to provide a single phase encoded carrier. For example, the combination step may choose the picked sample stream that corresponds with the largest carrier magnitude. The single combined phase encoded carrier is then demodulated to represent changes in strain at a particular point on the test fibre.

In summary these arrangements have a number of advantages:
1. Many combinations of component frequencies each contribute to carrier $f_m$. This improves sensitivity because
    i. The power that can be launched at a single frequency is generally limited by Stimulated Brillouin Scattering and other non-linear effects. Because the composite pulse consists many different frequencies, the total power that can be launched by the system described herein far exceeds the power that could be launched by a single frequency system. This leads to higher backscatter power and better SNR
    ii. Because a larger proportion of the optical detection band is occupied by wanted signal, detection SNR is improved in comparison with single frequency systems
    iii. Differential detection removes the effect of common-mode signals on the detectors, e.g. frequency shifter noise, electrical interference and some of the optical noises
2. As explained previously, by setting $\Delta f$ to an appropriate value the possibility of backscatter from neighbouring frequencies being both faded can be made very small. As different backscatter pairs form the carrier on each detector 214 and 215, it is in practical terms impossible that light from both detectors can be both faded.
3. By launching neighbouring frequencies with 45 degree or nearby relative polarisation state, light from 214 and 215 must contain interference, irrespective of the birefringence in source fibre during delay time $T_l$. If birefringence causes a light from (say) 1011 to be orthogonal to 1022, generating no interference light from that combination on detector 214, then that same rotation must cause 1021+1012 to generate interference light on 215. (The birefringence experienced by light of frequency difference around $\Delta f$ will be very similar)
4. A phase difference can be imposed by frequency shifters 211 and 212, such that the carrier $f_m$ received at 214 and 215 can have arbitrary phase difference. A feedback system may be required to compensate for changes receiver optics and maintain the phase difference required on the detectors 214 and 215. This phase difference may be used in two ways
    i. Where least susceptibility to fading and lowest noise is required a phase difference of 180 degrees will allow a strong carrier to be formed when 214 is taken from 215, thus reducing noise as described in detail above
    ii. Where highest dynamic range is required, a phase difference of 90 degrees will allow the strain change within each part of the fibre to be decoded without the need for reference to previous samples by quadrature detection.

Alternatively, un-delayed light can be superposed with delayed and downshifted or delayed and upshifted light as shown in FIG. 12.

Figure 18:
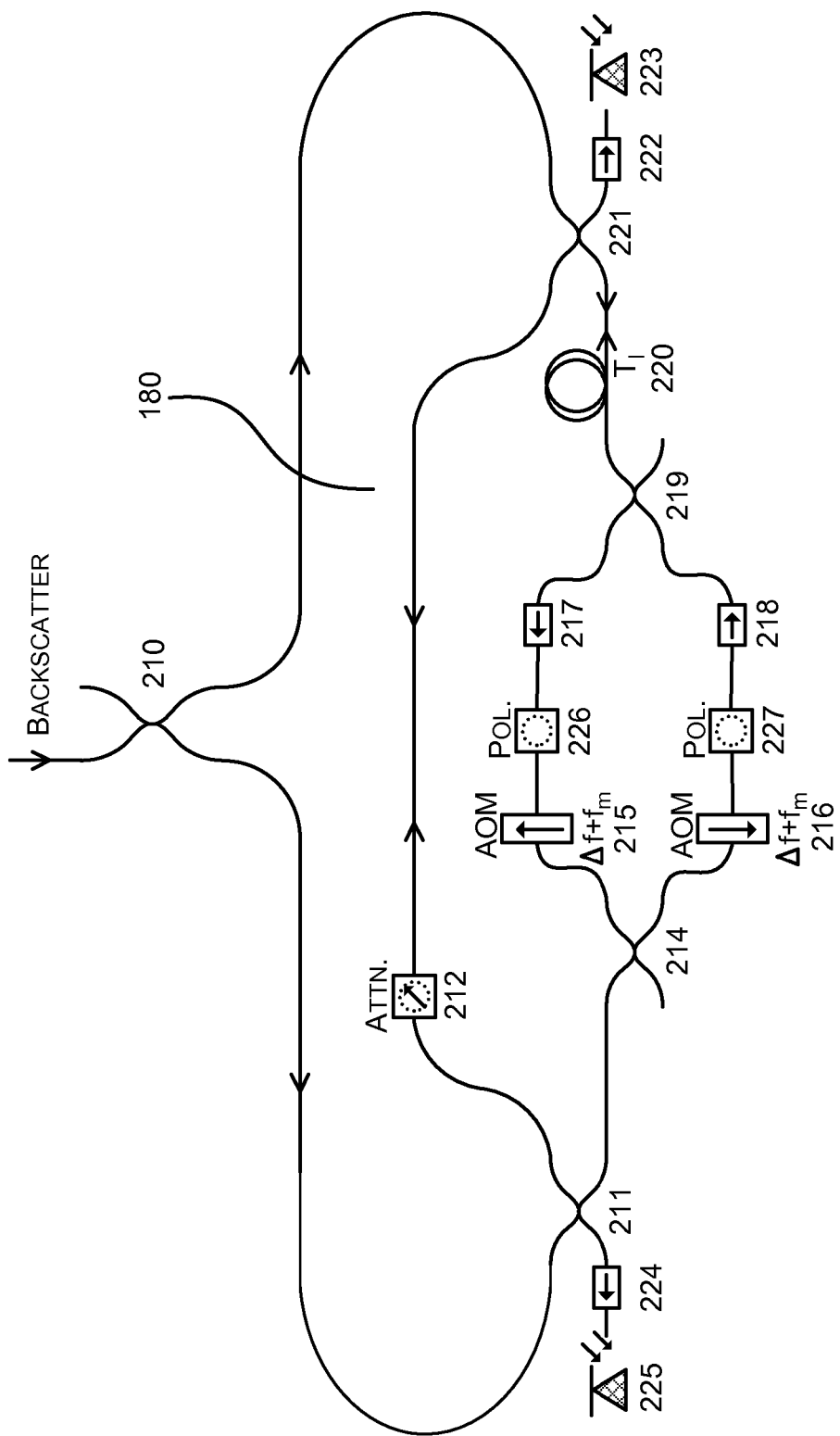
FIGS. 18 to 21 show example receivers for the system of FIG. 10.

FIG. 18 shows an example physical implementation of a time domain receiver as described functionally above in relation to FIGS. 11 and 12.

Received backscatter light is split by coupler 210, with each output directing light through the system in opposite directions. Couplers 211, 221 split the respective light, with a first portion following bypass path 180 which may include an optional attenuator 212 to adjust power levels. The other outputs of couplers 211, 221 couple light into a further pair of couplers 214, 219 which divide the light between two directional paths. Optical isolators 217, 218 limit light to propagating in the required direction on each path. The isolators may be positioned in any appropriate order with the other components in each path. For example it may be preferred to locate each isolator at the input end of each path to avoid reflections from frequency shifters 215, 216, or polarisation controllers 226, 227. Frequency shifter 215, for example an AOM, upshifts the optical frequency of the signal by $\Delta f+f$, and frequency shifter 216, for example an AOM, downshifts the optical frequency by $\Delta f+f_m$.

The upshifted and downshifted light propagates in the opposite direction through couplers 211, 214, 219, 221 and is received at receivers 223, 225 where the light mixes coherently with that which passed via bypass path 180.

Figure 19:
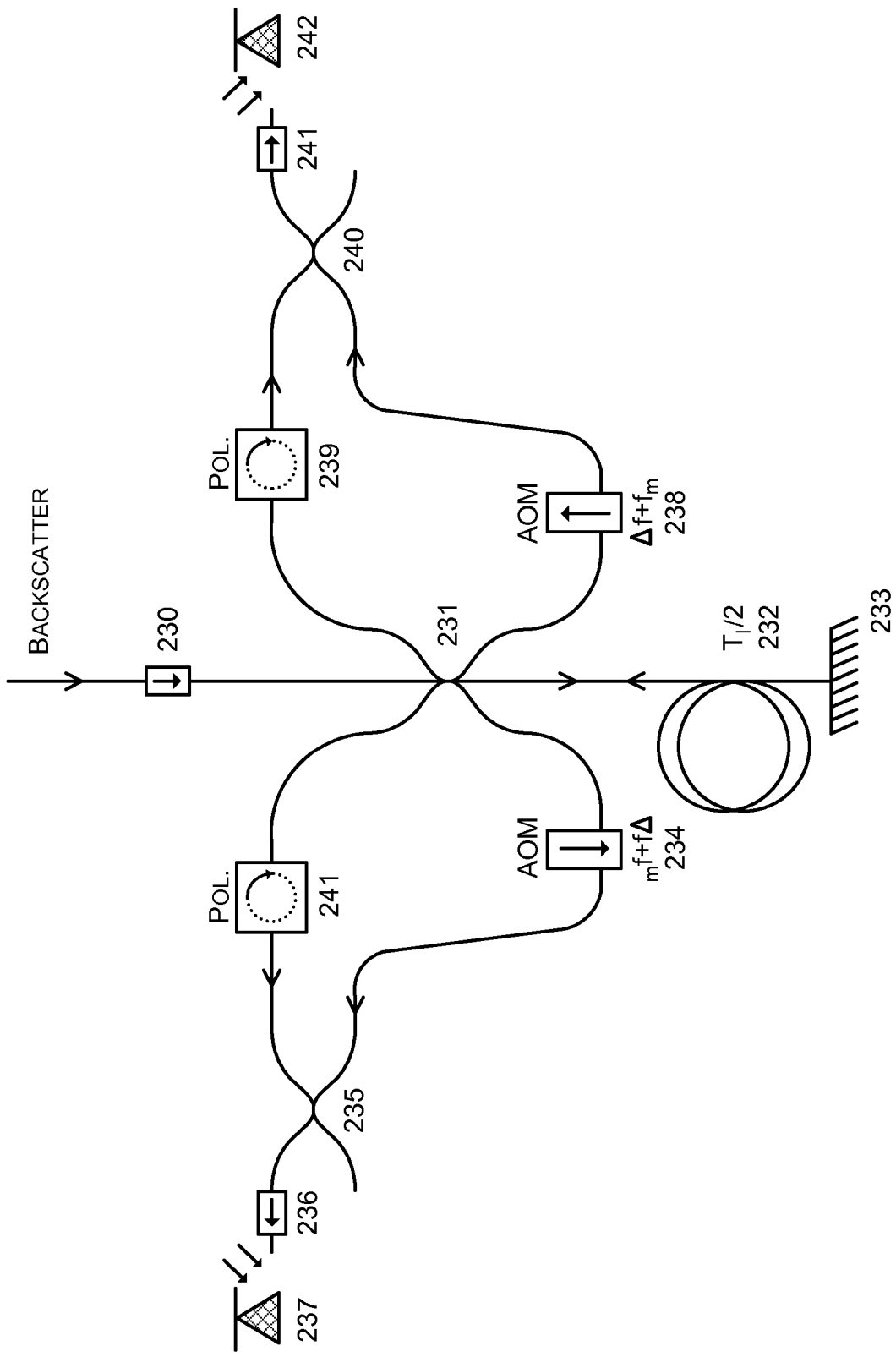

FIG. 19 shows a further physical implementation of a time domain receiver. Received backscatter light is split into three components by 3×3 coupler 231. One component is directed through delay coil 232 having delay ($T_l/2$) and onto Faraday mirror 233. The light returning to coupler 231 has thus been delayed by $T_l$. The Faraday Mirror mitigates any birefringence effects in the delay coil 232.

The other two outputs from coupler 231 are directed respectively to an upshifter 238 and a downshifter 234, each of which may be an AOM as described above. The upshifted and downshifted light is combined with delayed light in couplers 235, 240 and directed to receivers 237, 242 for detection. Optional polarisation controllers 239, 241 may be included to ensure alignment of the polarisations of delayed and shifted signals at the detectors 237, 242. The receiver of FIG. 19 thus generates the required combinations of signals at the detectors.

Figure 20:
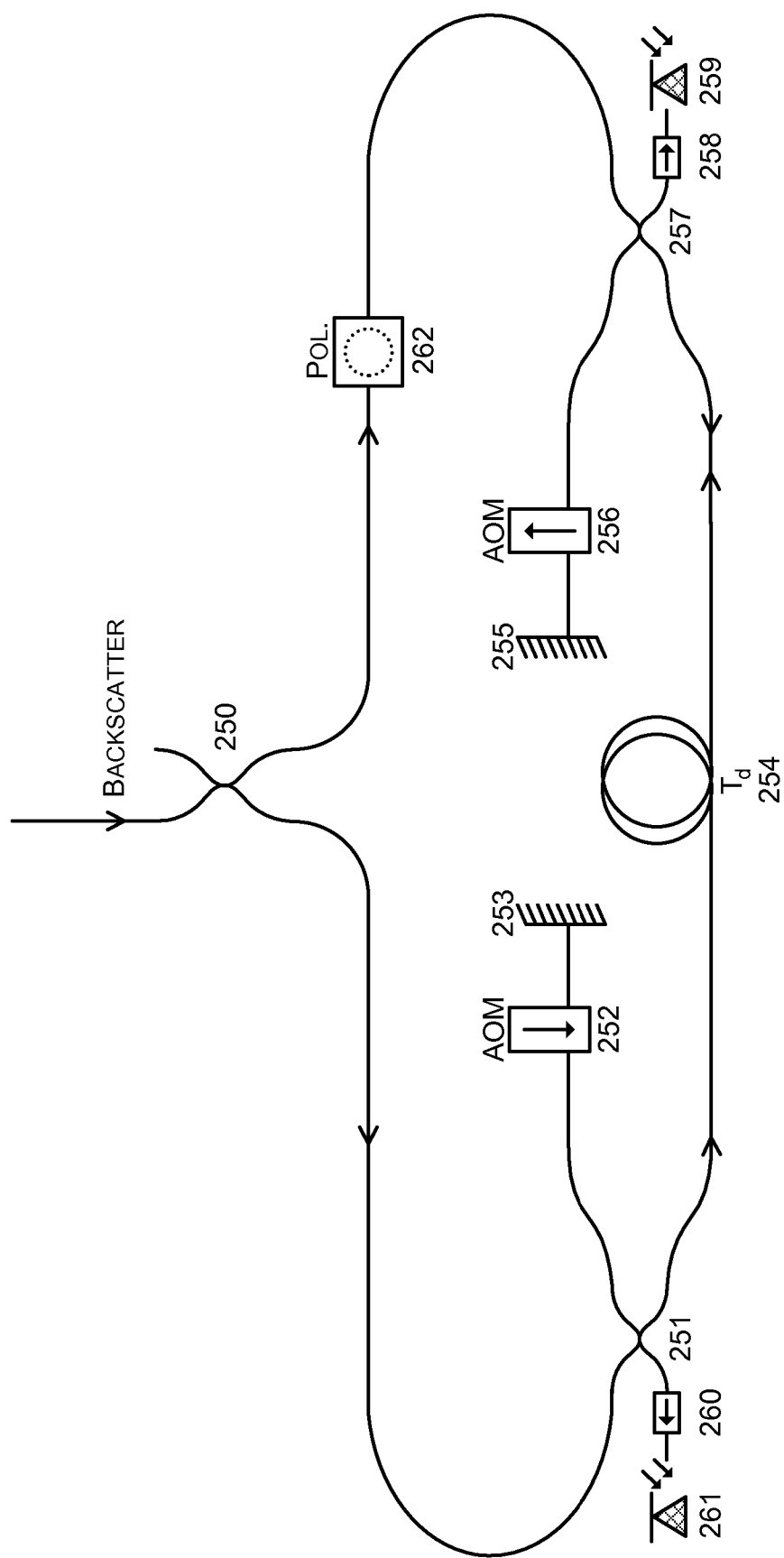

FIG. 20 shows a further physical implementation of a time domain receiver. Received backscatter light is split by coupler 250. One output of coupler 250 is coupled to coupler 251 which divides the light into a delay path 254 and a downshift path. The other output of coupler 250 is coupled to coupler 257 which divides the light into a delay path 254 and an upshift path.

The downshift path comprises an AOM 252 and Faraday mirror 253. Light passes into the downshift path, is downshifted in optical frequency in two passes through the downshifter 252 and returns to coupler 251. The AOM 252 is operated at an RF frequency of $(\Delta f+f_m)/2$, which provides a total frequency shift of $(\Delta f+f_m)$. Downshifted light is mixed with delayed light in coupler 251 and passed to detector 261 where it mixes coherently and is detected. Similarly light is upshifted by AOM 256 and mixes with delayed light at receiver 259, thereby generating the required components. Optional polarisation controller 262 may be included to remove birefringence in the receiver system.

Figure 21:
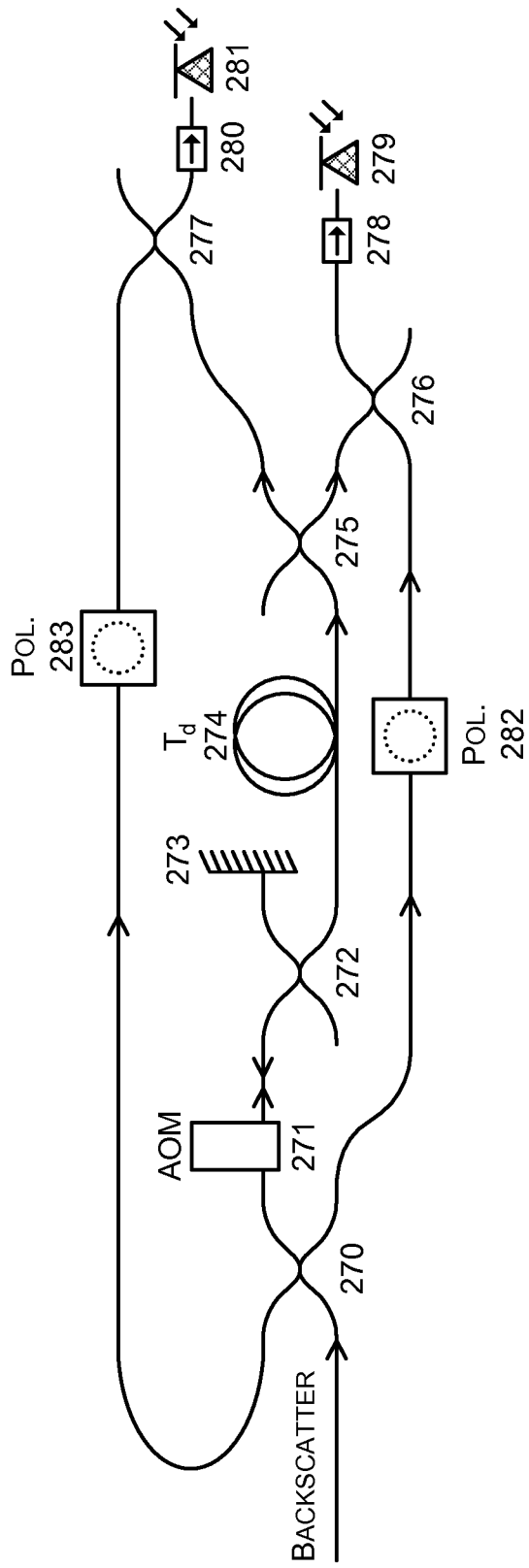

FIG. 21 shows a further example of a receiver, utilising only one frequency shifter. Received backscatter light is coupled to coupler 270, one output of which is connected to first bypass path 282. The other output of coupler 270 is connected to AOM 271 which shifts the frequency by $\Delta f+f_m$ (either upshift or downshift) A further coupler 272 directs the shifted light to Faraday mirror 273, which reflects light back through the AOM 271 and via coupler 270 to second bypass path 283. The other output of coupler 272 couples light through delay element 274, and then via couplers 275, 276, 277 to detectors 279, 281. At detector 279 the delayed, shifted light is mixed with the unshifted, undelayed light via bypass path 282. At detector 281 the delayed, twice shifted light is mixed with once-shifted light. At both detectors therefore there is a mixing of components with one $\Delta f$ between them. Optional polarisation controllers 283 and 282 are set to compensate for birefringence in the optical system.

Figure 22:
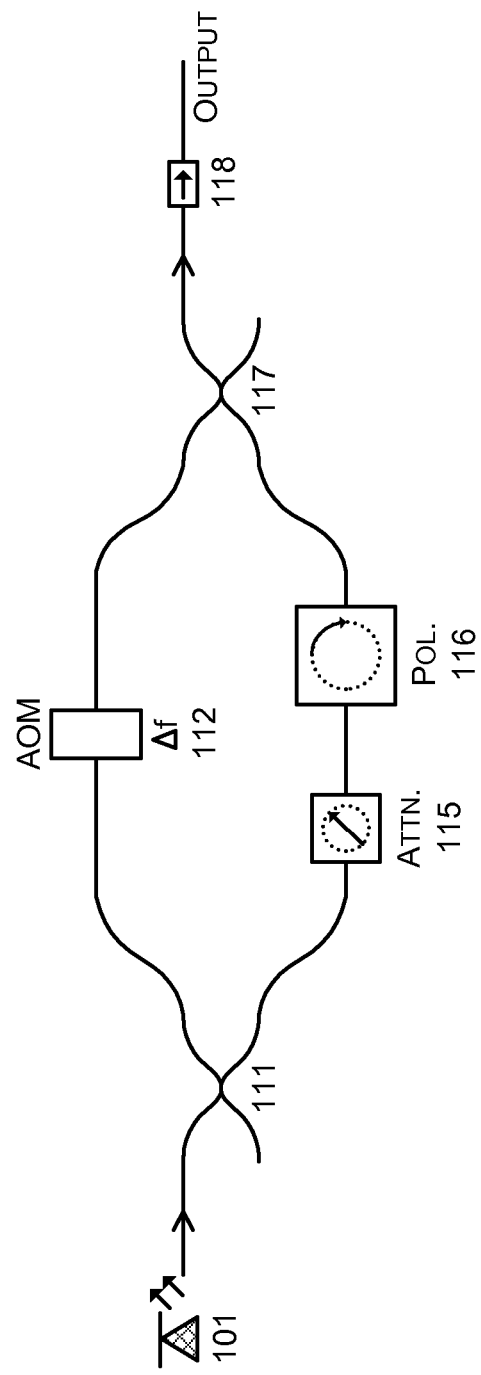
FIGS. 22 to 29 show example light sources.

FIG. 22 shows an example two-component frequency source generator. Light from a low frequency noise laser 101 is split by coupler 111 into two components. One path is frequency shifted by $\Delta f$ by AOM 112. The remaining light from 111 passes through optional attenuator 115 to balance the component amplitude and optional polarisation controller 116, which can be used to set a difference between the polarisation of the two frequency source components. The two paths are re-combined by coupler 117, through optional isolator 118, then to the output.

Figure 23:
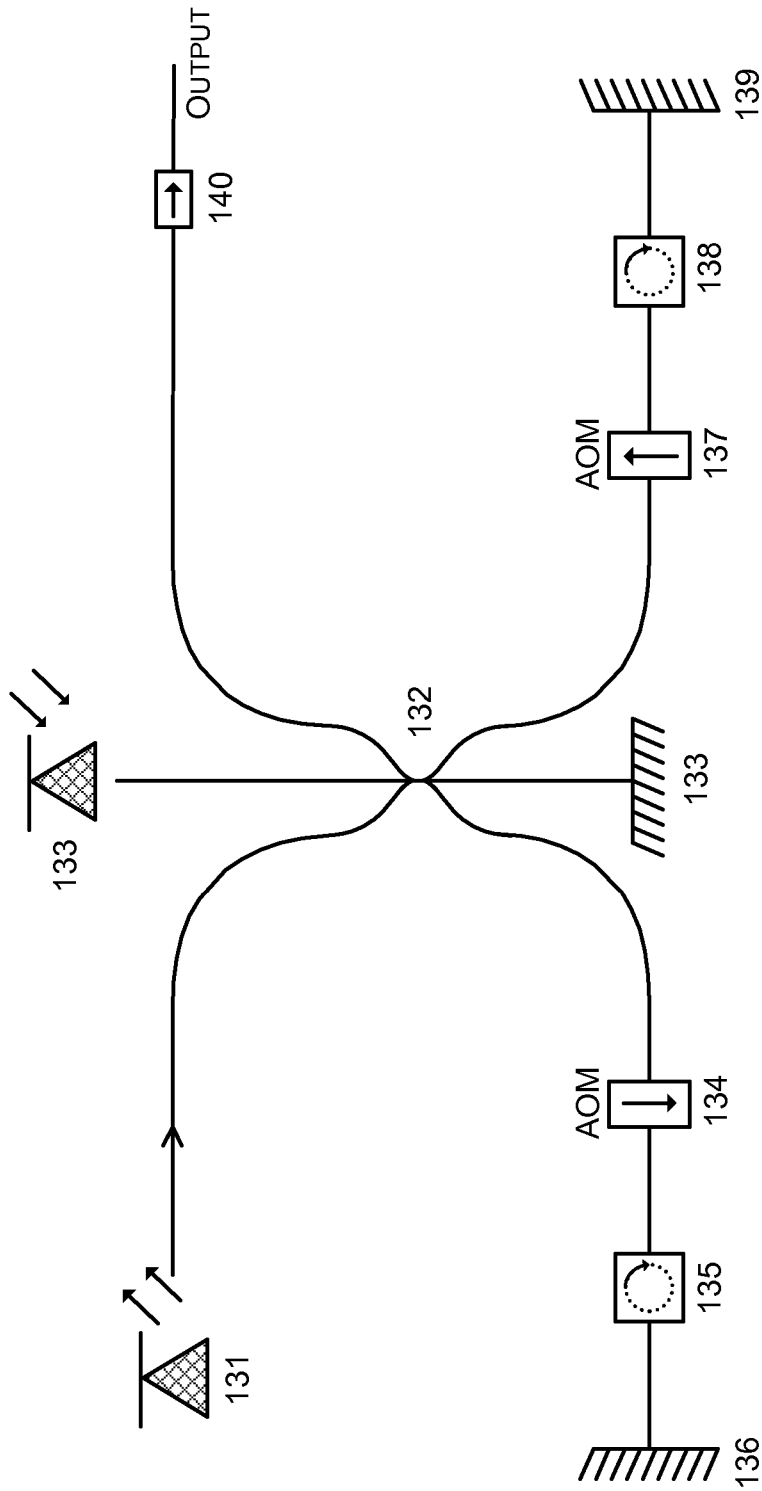

FIG. 23 shows an alternate source generator which produces three frequency components. Light from laser source 131 is split by 3×3 coupler 132. Part of the output light is reflected un-shifted through FRM 133. A remaining portion is directed through upshift AOM 137 and via polarisation shifter 138 and is reflected by FRM 139 back into coupler 132. In this way three light components appear at the output. By detecting components at $\Delta f$, light at detector 133 can be used to balance power from the three components. Polarisation rotators 138 and 135 can be used to set the relative polarisation of the three components.

Figure 24:
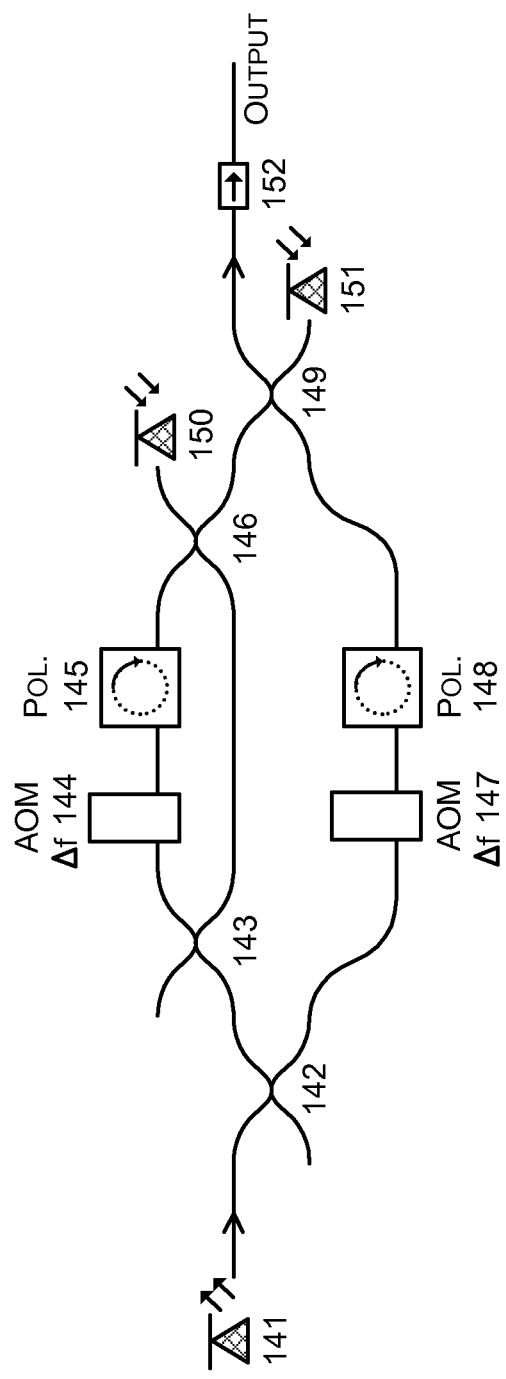

FIG. 24 shows a second example configuration for generating three component frequencies. Here light from a low frequency noise laser source 141 is split by coupler 142. Part of the light is further split by coupler 143. An un-shifted portion of the light continues through couplers 146 and 149, through optional isolator 152 to the output. A further part of the light is shifted by AOM 144, polarisation adjusted by controller 145, then recombined to arrive at the output. A further path through coupler 142 and AOM 147 (which is chosen to shift light in the opposite sense from AOM 144), and polarisation control 148 to appear at the output. The polarisation controllers can be used to generate any desired relative polarisation between the components. $\Delta f$ component at 150 and 151 can be monitored to balance the magnitude of output at the three frequencies.

Figure 25:
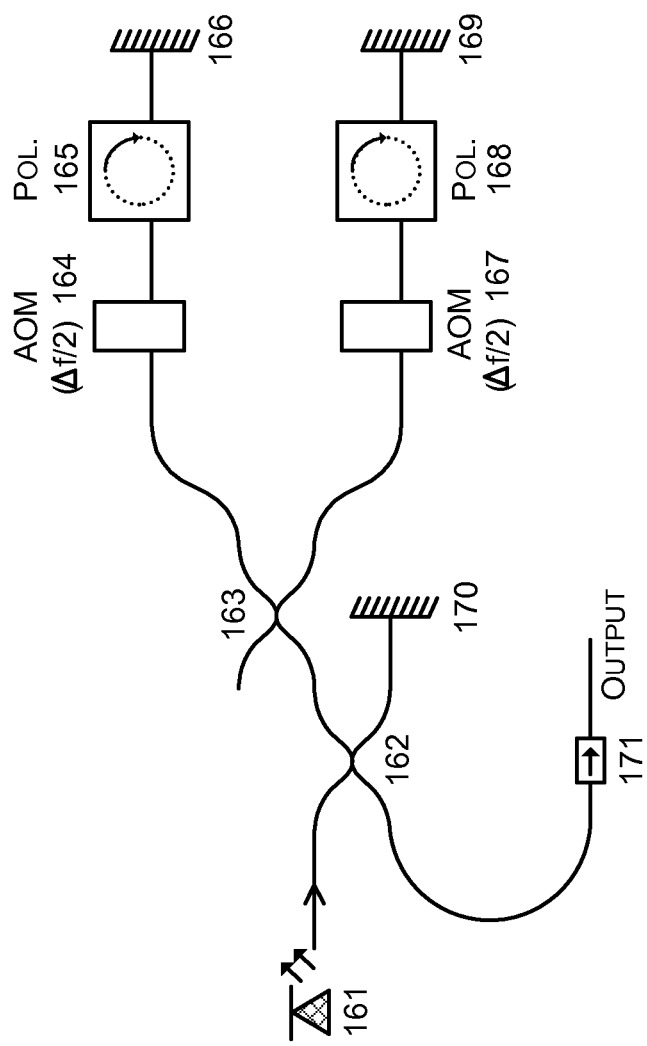

FIG. 25 shows a further option for generating three frequency components. Light from laser 161 is split by coupler 162. Part of the emerging un-shifted light is reflected by 170, back through coupler 162, via optional isolator 171 to the output. 170 may be a Faraday Rotator Mirror, to remove the effect of birefringence in the optical components. The remaining light from 162 is directed to coupler 163, where it is further split. Part of the light is up-shifted by 164, the remaining part is down-shifted by 167 and reflected back to the output by 166 and 169, which may be FRMs. Optional polarisation shifters, 165 and 168 which may be Faraday rotators, allow the components to have relative polarisation as desired.

Figure 26:
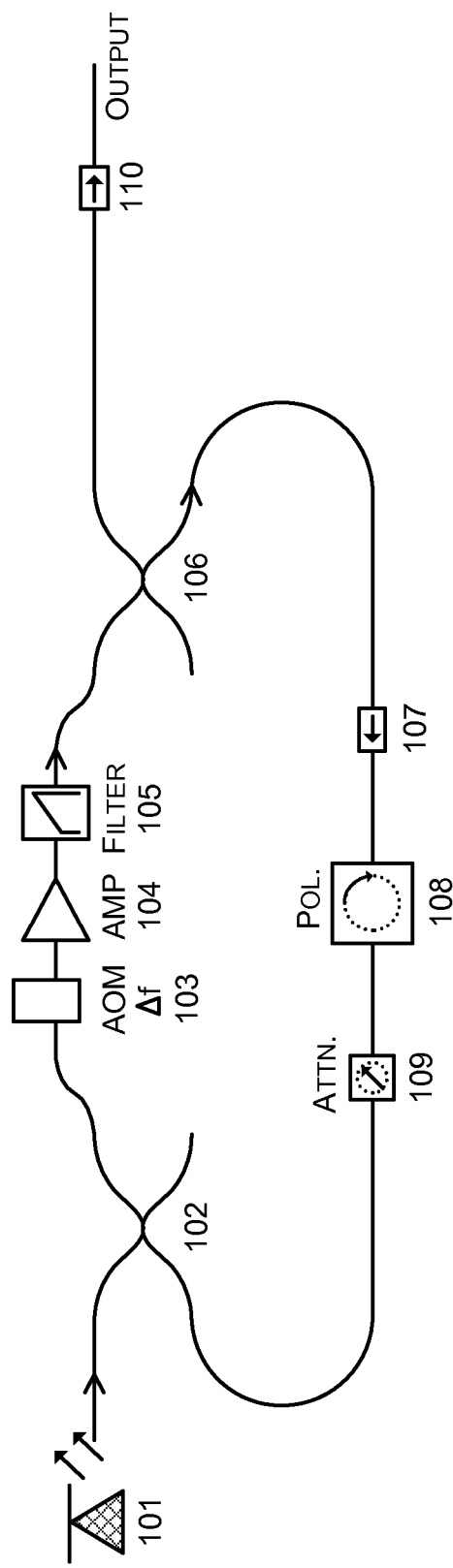

FIG. 26 shows an example configuration for generating multiple frequencies based on a recirculating loop. Light from low-frequency noise laser 101 is coupled into the loop by coupler 102. Part of the light continues through AOM 103, where it is shifted by $\Delta f$. Amplifier 104 makes up for the loss of the loop, filter 105 limits the number of frequencies generated and improves SNR. Coupler 106 splits some of the light out of the loop towards the output via optional isolator 110. The remaining light is coupled by optional isolator 107 through optional polarisation rotator 108 (which may be a 45 degree faraday rotator), through optional attenuator 109, and back into the loop via coupler 102. The attenuator 109 can be used to tune the loop and balance the power of all the multiple components. Filter 105 can be arranged to both limit the number of frequencies generated, and provide pre-emphasis to balance the CNR of each of the frequencies.

Figure 27:
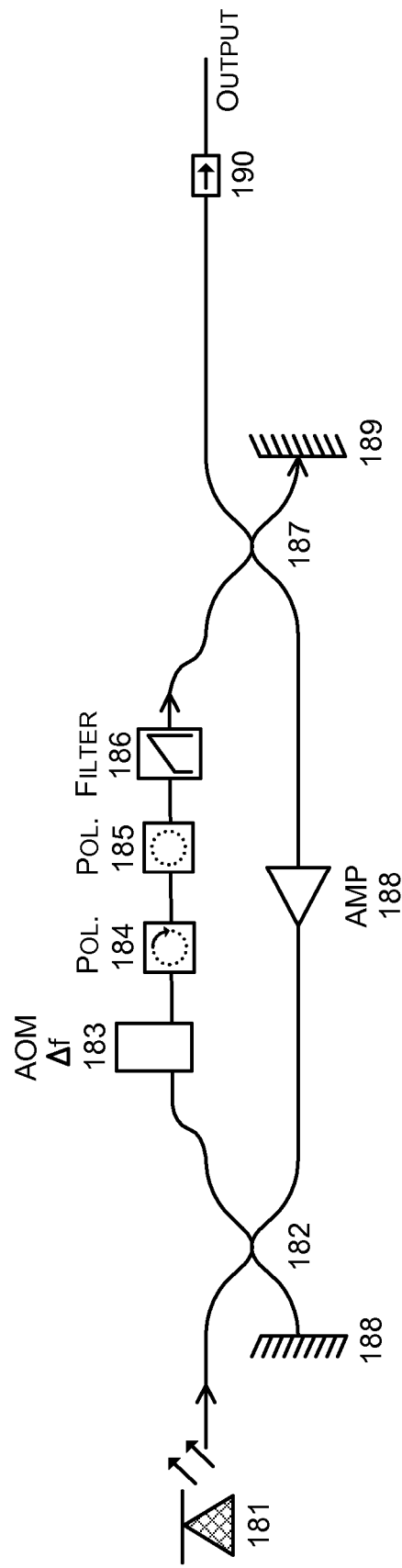

FIG. 27 shows an alternate version where light from a source 181 is split by coupler 182, then travels through AOM 183, through polarisation controller 184, polarisation rotation stage 185, band pass filter 186, through coupler 187 and through optional isolator 190 to the output. Amplifier 188 recirculates light, such that multiple light components are generated at the output. Filter 186 can be used to balance SNR of the components and limit the number of components that are generated.

Figure 28:
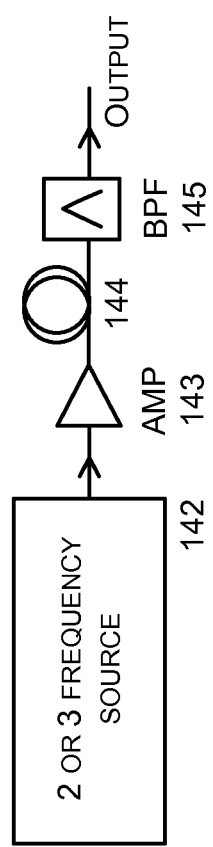

FIG. 28 shows an alternate arrangement for generating multiple frequencies. A two or three frequency source 142 is amplified by 143. A highly non-linear fibre (e.g. photonic crystal fibre) 144 plus the amplifier fibre generates additional frequency components by four-wave mixing. BPF 145 limits the components to the number and wavelength range required.

Figure 29:
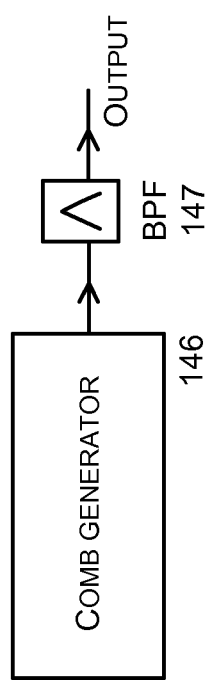

FIG. 29 shows an alternate configuration. Here a comb generator output is bandpass filtered to the range of interest. Note, for some comb generator types, the number of frequencies generated will be given by $T_j \cdot \Delta f$, so a longer $T_j$ may be required to ensure sufficient components are launched.

Figure 30:
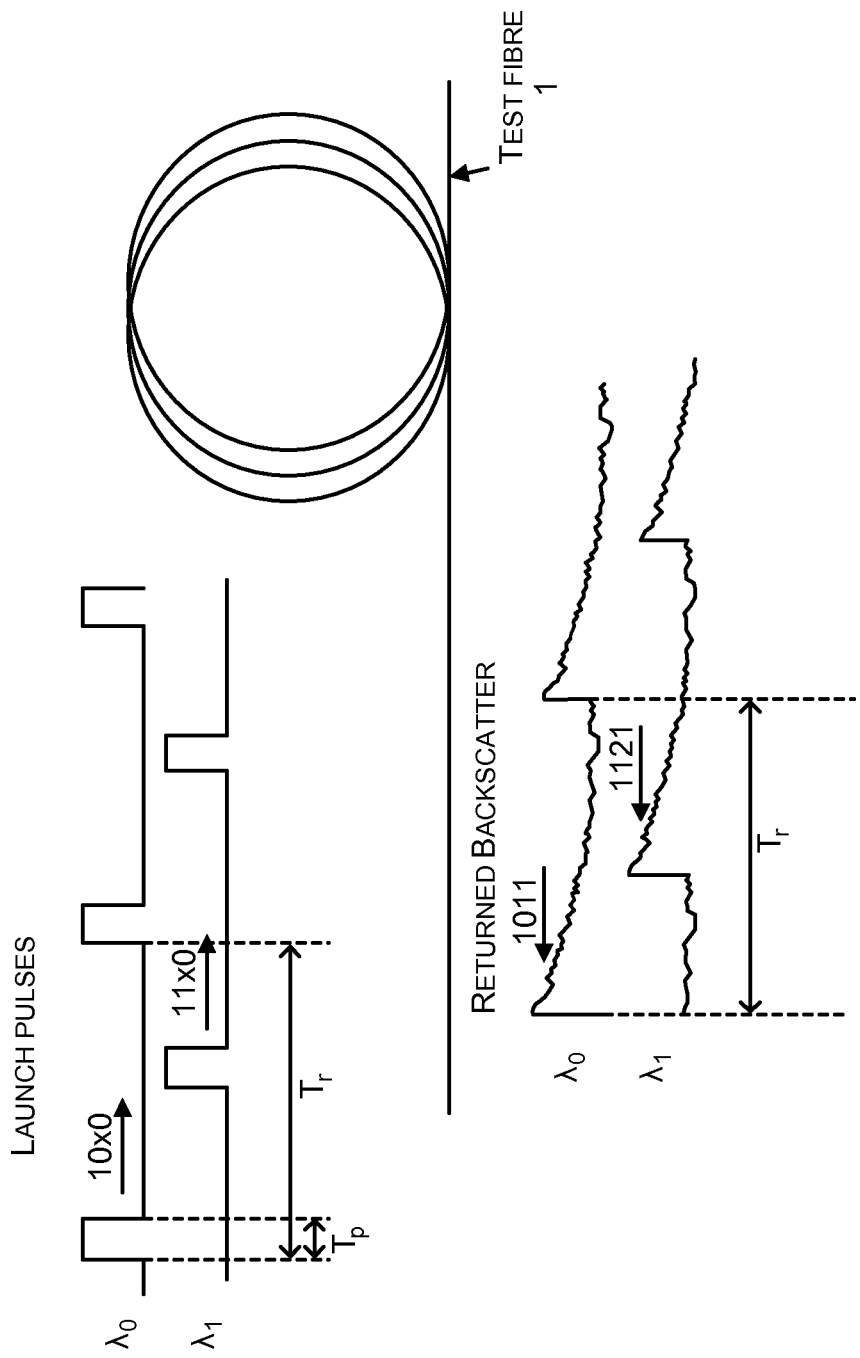
FIG. 30 shows a system using offset pulses.

In the foregoing description a plurality of probe signals at defined frequencies have been transmitted. A series of aligned pulses at each frequency are transmitted into the measurement fibre. In order to improve the sensitivity and dynamic range of the system, a second set of probe signals may be transmitted as shown in FIG. 30. The second set of signals have the same characteristics described above, but are located at a second wavelength, discrete from the wavelength at which the first signals are located. That is, there are a plurality of optical signals at $\lambda 0$ and a plurality at $\lambda 1$ with no overlap in the frequency/wavelength domain between the signals at $\lambda 0$ and at $\lambda 1$. The signals at $\lambda 0$ and $\lambda 1$ are both a series of pulses in the time domain as described above, but with a time offset between the series as seen in FIG. 30.

At the receiver the two wavelengths are separated and detected independently. The receiver architectures described above can be utilised for both wavelengths, with each wavelength being directed to a detector for the specific wavelength. For example utilising a wavelength selective demultiplexer immediately prior to a plurality of detectors.

This system increases the dynamic range of the system because the sampling rate is doubled, thereby allowing a higher maximum instantaneous rate of change of phase. Sensitivity is also increased due to the sampling rate doubling.

More than two sets of signals may also be utilised to further improve performance.

The signals can be obtained by splitting the light from one wide bandwidth source generator, or by having two separate source generators derived from two lasers.

Figure 31:
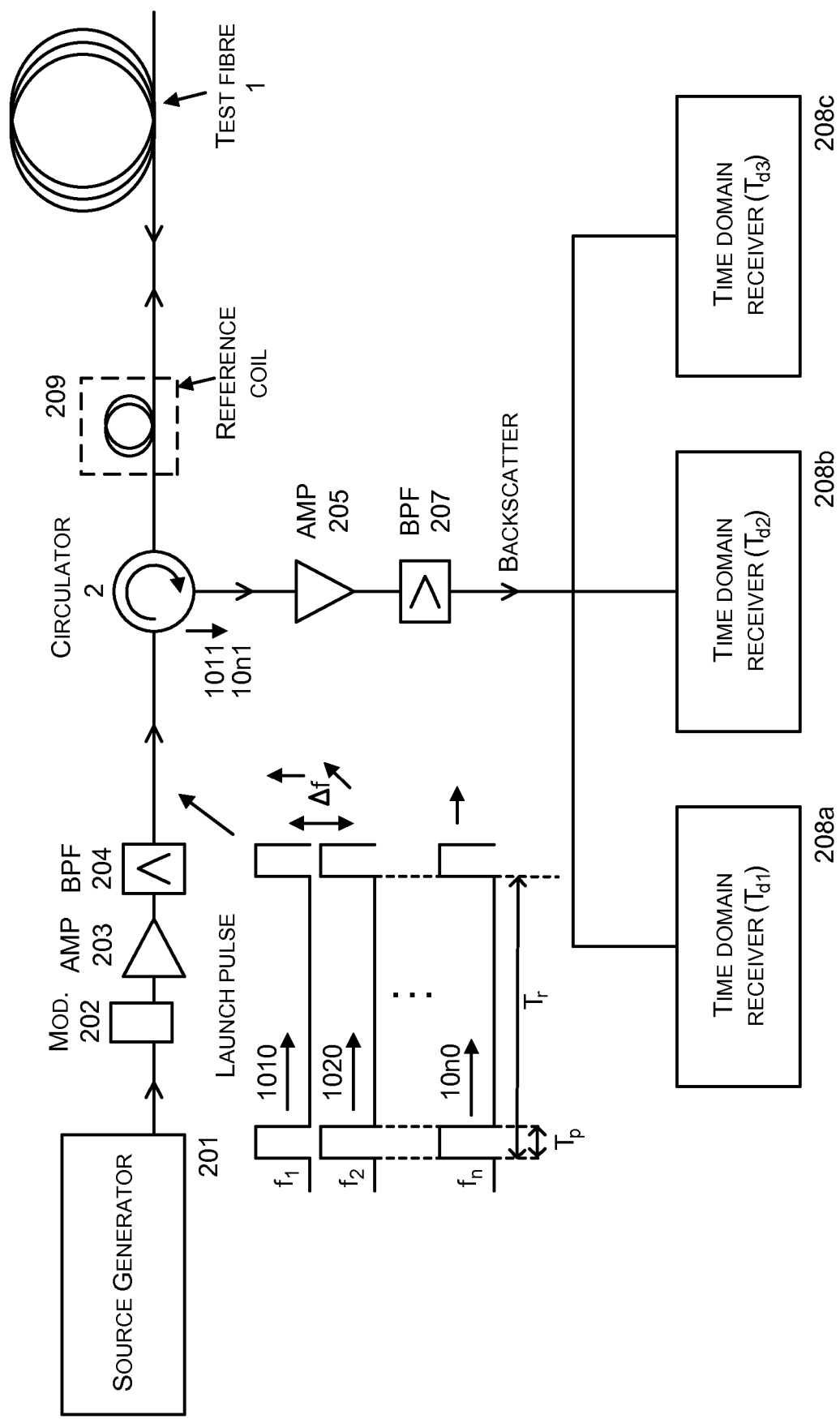
FIGS. 31 and 32 show a sensing system using a plurality of receivers.

The delay length in the time domain receiver sets the gauge length over which changes in phase in the test fibre are computed. For various applications, different gauge lengths may be desirable. This can be accommodated by splitting the backscatter light to two or more receivers each with a different time, as shown in FIG. 31. The arrangement of FIG. 31 enables different gauge lengths to be measured simultaneously. Furthermore, variable delay elements can be used in any receiver to provide variable gauge lengths.

Figure 32:
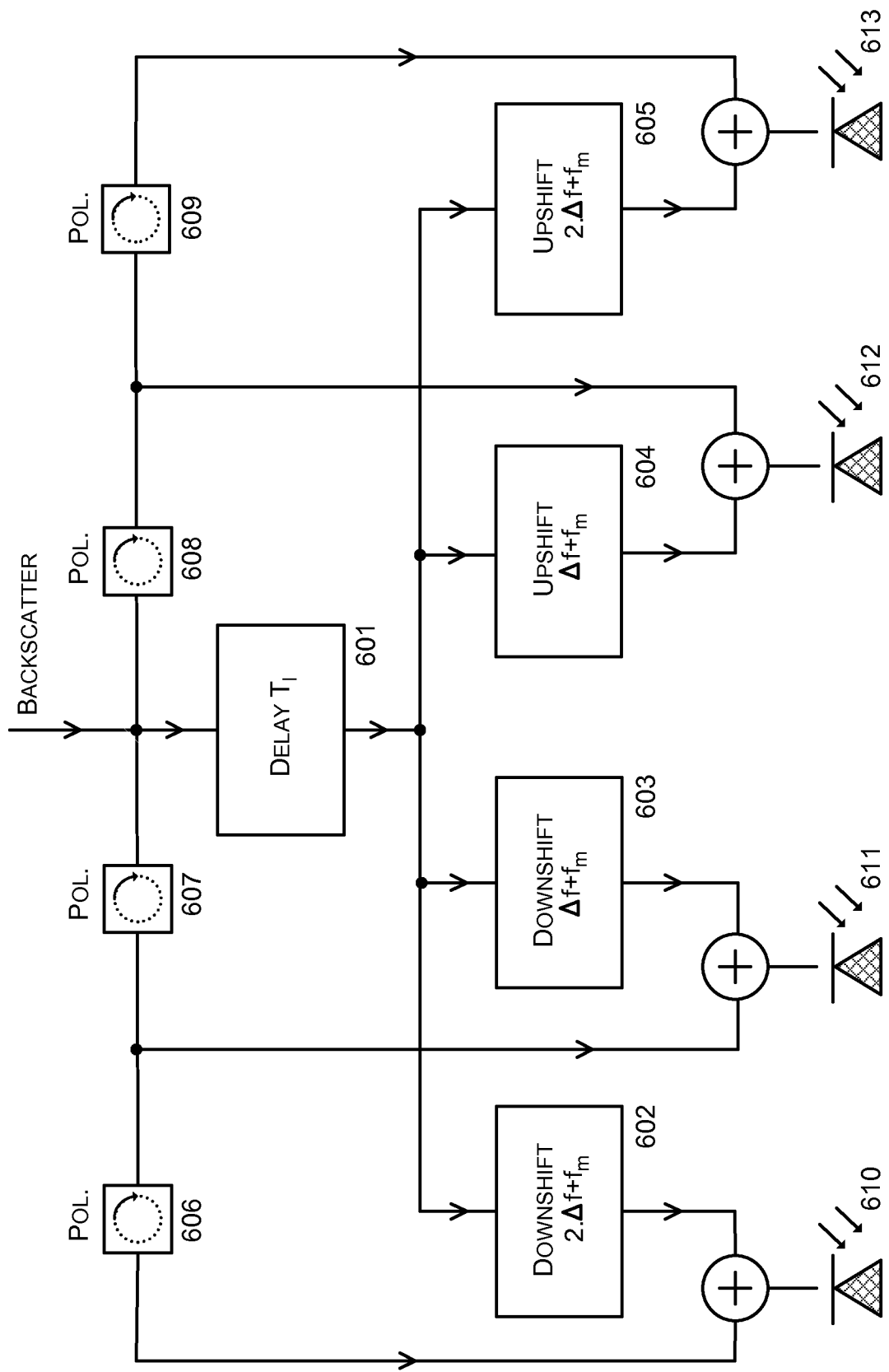

The frequency shift in the receiver system sets the combinations of backscatters that beat on the detector to generate the carrier. By introducing a second set of receivers with a different upshift and downshift, as shown in FIG. 32, different combinations of frequencies can be directed to the detectors. Each receiver uses a frequency shift equal to $n \cdot \Delta f + f_m$ such that different combinations of carriers mix to produce the same heterodyne carrier at $f_m$.

This may have advantages where significant birefringence or fading is observed, because the likelihood of the signals on all detectors 610-613 being faded is reduced compared with the likelihood of 611 and 612 both being faded.

The above description has been given primarily with reference to purely distributed sensors. However, the techniques and apparatus may also be applied to systems with reflectors to produce specific return signals at defined locations along a fibre. This may be desirable to increase the sensitivity of the measurement fibre at defined locations along the measurement fibre. Furthermore, the system may provide sufficient sensitivity to detect events using a suitable transducer. For example a length of fibre may wound around a transducer which translates acceleration into fibre strain. The system described herein may be able sense changes in the relatively short length of fibre associated with the transducer to detect acceleration. In this case the described system has the advantage that backscatter light derived from within the modulated fibre length may be used to make measurements without particular need for insensitive fibre near the transducer. This is because the system is insensitive to fading caused by strain changes in the transducer fibre.

Any of the optical couplers described herein may be equal couplers or may be configured with unequal coupling ratios to each output. The required ratios are selected to optimise performance of the system.

Although the present invention has been described in connection with some embodiment, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. An optical sensing system, comprising:
    a source generator configured to generate a set of n time-aligned optical probe pulses, each pulse being at a distinct optical frequency selected from f1, f2, . . . fn, where n is the number of pulses and n is equal to 2 or more, each optical frequency being spaced from its neighbour by $\Delta f$, the source generator being configured to transmit the optical probe pulses into a sensing optical fibre, wherein the optical probe pulses are backscattered by the optical sensing fibre, at least part of the backscattered light being captured by the optical fibre in a reverse direction to the optical probe pulse propagation,
    an optical receiver system configured to receive the backscattered light from the optical sensing fibre, wherein the optical receiver system is configured to mix a delayed version of the backscattered light with at least one frequency-shifted version of the backscattered light, wherein the frequency is shifted by $-(\Delta f+fm)$, where fm is a predetermined frequency and fm is less than $\Delta f$.

2. An optical system according to claim 1, wherein the sensing optical fibre comprises at least one sensing region adapted to increase the sensitivity of the system to changes occurring in the at least one sensing region.

3. An optical system according to claim 1, wherein the detected amplitudes are decoded to provide an indication of strain changes along the sensing optical fibre.

4. An optical system according to claim 1, wherein $\Delta f = v/Td$, where Td is the optical observation time and v is any non-zero integer.

5. An optical system according to claim 1, 1 where $\Delta f = (1+2w)/(2 \cdot Tl)$ and/or $(1+2v)/(2 \cdot Td)$ where w and v are any integers, Td is the optical signal observation time and Tl is the backscatter delay time.

6. An optical system according to claim 1, wherein $\Delta f$ is approximately 100-600 MHz.

7. An optical system according to claim 1, wherein n is 50 or greater.

8. A method of detecting strain in an optical sensing fibre, the method comprising the steps of:
    generating a set of n time-aligned optical probe pulses, each pulse being at a distinct optical frequency selected from f1, f2, . . . fn, where n is the number of pulses and n is equal to 2 or more, each optical frequency being spaced from its neighbour by $\Delta f$,
    transmitting the optical probe pulses into a sensing optical fibre, wherein the optical probe pulses are backscattered by the optical sensing fibre, at least part of the backscattered light being captured by the optical fibre in a reverse direction to the optical probe pulse propagation,
    receiving backscattered light from the optical sensing fibre, an optical receiver system configured to receive the backscattered light from the optical sensing fibre, wherein the optical receiver system is configured to mix a delayed version of the backscattered light with at least one frequency-shifted version of the backscattered light, wherein the frequency shift is $-(\Delta f+fm)$, where fm is a predetermined frequency and fm is less than $\Delta f$, and
    determining phase changes at locations along the optical sensing fibre based on changes in the detected amplitude and the time of the samples showing the changes in amplitude.

9. The method of claim 8, wherein $\Delta f=(1+2v)/Td$, and/or $\Delta f=(1+2w)/Tl$ where Td is the optical observation time, Tl is the backscatter delay time, and v and w are integers.

10. The method of claim 8, wherein the set of optical probe pulses are generated by modulation of a set of source optical signals, each source optical signal being at a distinct optical frequency selected from f1, f2, . . . fn.

11. The method of claim 8, wherein the polarisation of each optical probe pulse is different to the polarisation of optical probe pulses, at adjacent optical frequencies.

12. The method of claim 11, wherein the polarisation of adjacent optical probe pulses is not orthogonal.

13. The method of claim 8, wherein $\Delta f$ is between 100 MHz-600 MHz.

14. A method of detecting strain in an optical sensing fibre, the method comprising the steps of:
    generating a set of n time-aligned optical probe pulses, each pulse being at a distinct optical frequency selected from f1, f2, . . . fn, where n is the number of pulses and n is equal to 2 or more, each optical frequency being spaced from its neighbour by $\Delta f$, transmitting the optical probe pulses into a sensing optical fibre, wherein the optical probe pulses are backscattered by the optical sensing fibre, at least part of the backscattered light being captured by the optical fibre in a reverse direction to the optical probe pulse propagation, receiving backscattered light from the optical sensing fibre, detecting the amplitude of backscattered light, and determining phase changes at locations along the optical sensing fibre based on changes in the detected amplitude and the time of the samples showing the changes in amplitude.

15. The method of claim 14, wherein $\Delta f = v/Td$, where Td is the optical observation time and v is a non-zero integer.

16. The method of claim 14, wherein the polarisation of each optical probe pulse is different to the polarisation of optical probe pulses, at adjacent optical frequencies.

17. The method of claim 16, wherein the polarisation of adjacent optical probe pulses is not orthogonal.

18. The method of any of claim 14, wherein $\Delta f$ is between 100 MHz-600 MHz.

19. The method of claim 14, wherein the set of optical probe pulses are generated by modulation of a set of source optical signals, each source optical signal being at a distinct optical frequency selected from f1, f2, . . . fn.

* * * * *